United States Patent

Hutch et al.

[15] 3,665,414
[45] May 23, 1972

[54] MULTI-POINT RECORDER WITH SOLID STATE PROGRAMMER

[72] Inventors: Frederick S. Hutch, Glenside; Bruce G. Phares, Philadelphia, both of Pa.

[73] Assignee: Honeywell Inc., Minneapolis, Minn.

[22] Filed: Aug. 12, 1970

[21] Appl. No.: 63,079

[52] U.S. Cl. .............................................. 340/172.5, 346/34
[51] Int. Cl. .................................................. G01d 9/00
[58] Field of Search .............................. 340/172.5; 346/34

[56] References Cited

UNITED STATES PATENTS 3,295,140  12/1966  Parker, Jr. et al. ........................ 346/34
3,303,509  2/1967  Smith, Jr. .................................. 346/34
3,317,913  5/1967  Paschkis .................................... 346/34
3,396,404  8/1968  Parker, Jr. ................................. 346/34
3,553,712  1/1971  MacMullan et al. ........................ 346/34

Primary Examiner—Raulfe B. Zache
Attorney—Arthur H. Swanson and Lockwood D. Burton

[57] ABSTRACT

A multipoint recorder includes a solid state electronic digital programmer which includes a clock means for generating basic timing pulses which includes a clock means for generating basic timing pulses which are conditioned by a plurality of solid state circuits to operate the recorder in a predetermined operational sequence.

18 Claims, 31 Drawing Figures

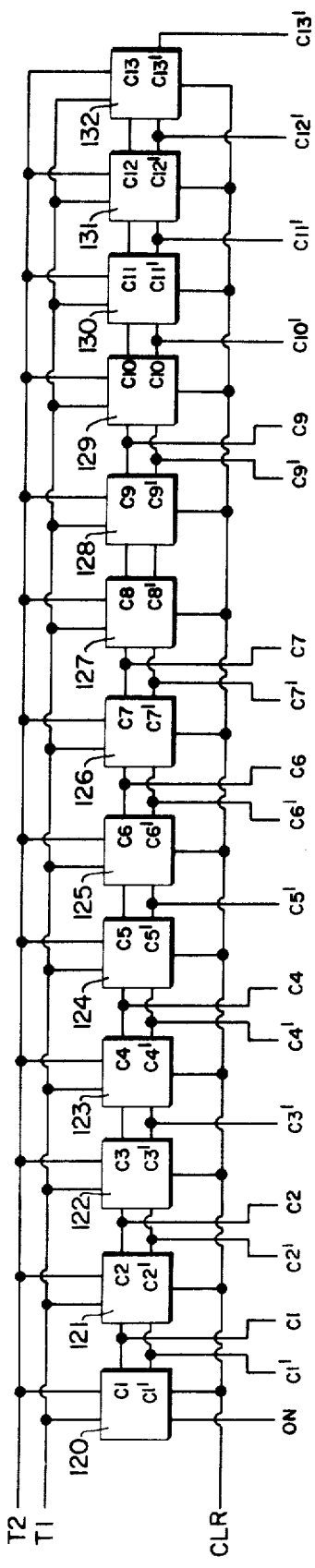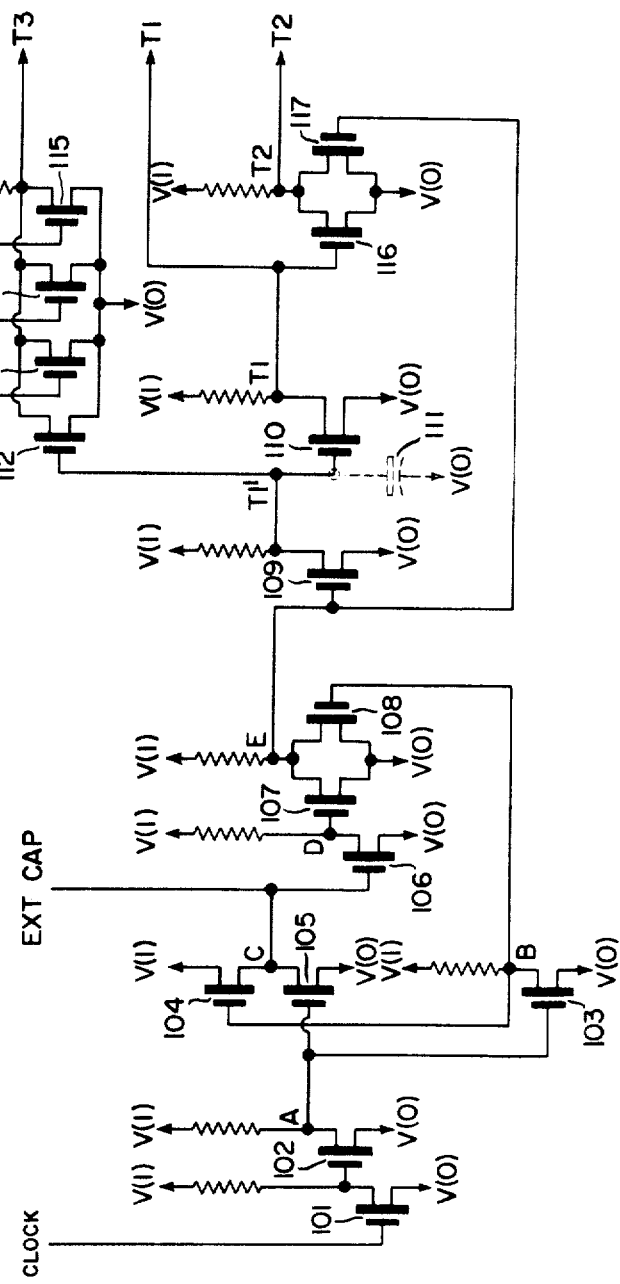

INVENTORS.
FREDERICK S. HUTCH
BRUCE G. PHARES
BY
*Lockwood D. Burton*
ATTORNEY.

INVENTORS.
FREDERICK S. HUTCH
BRUCE G. PHARES

BY *Lockwood D Burton*

ATTORNEY.

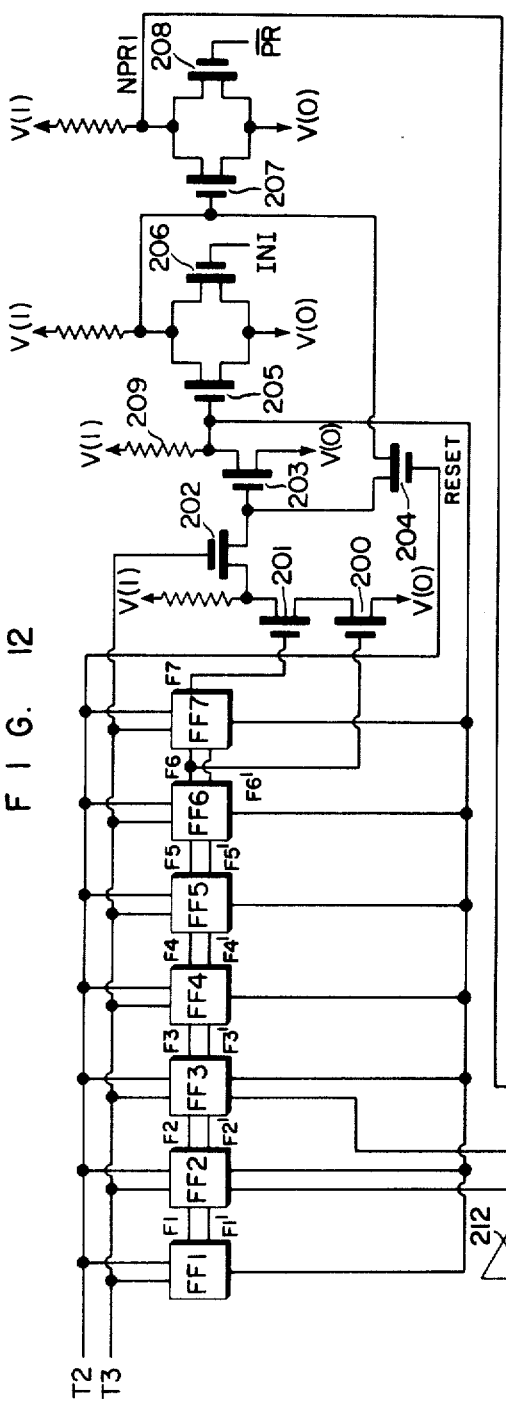
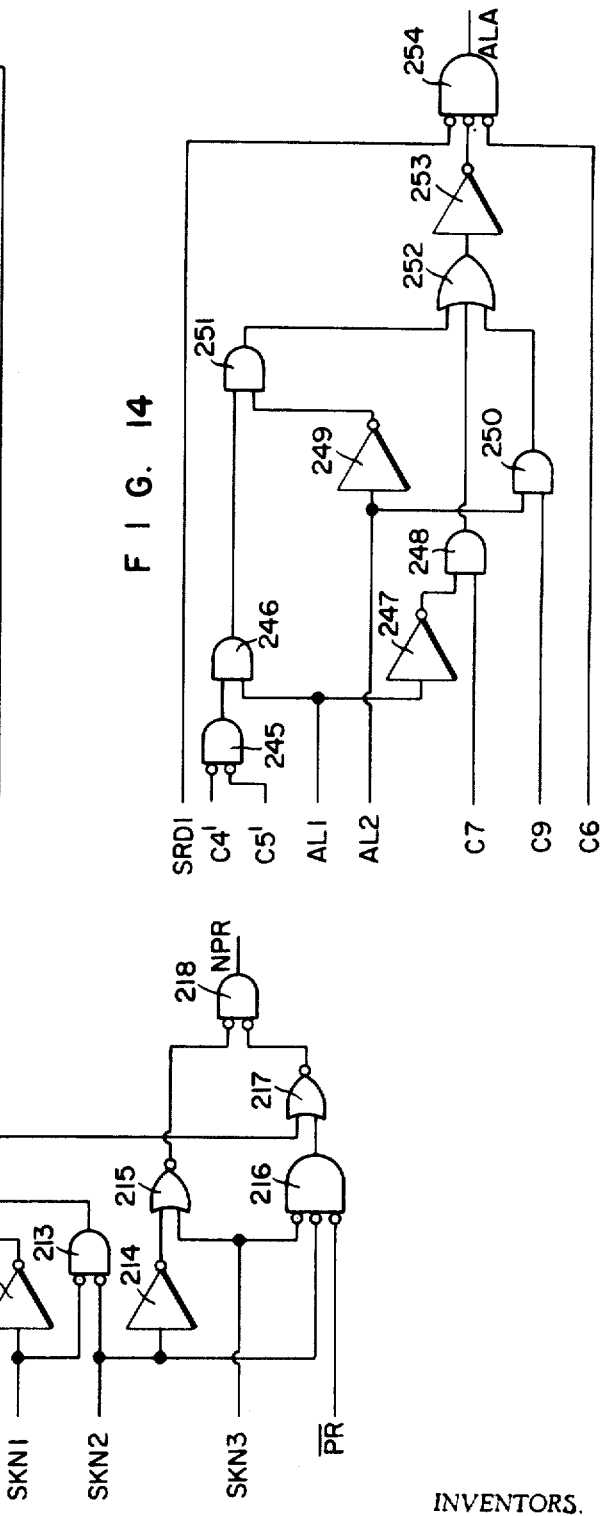
FIG. 12
FIG. 14

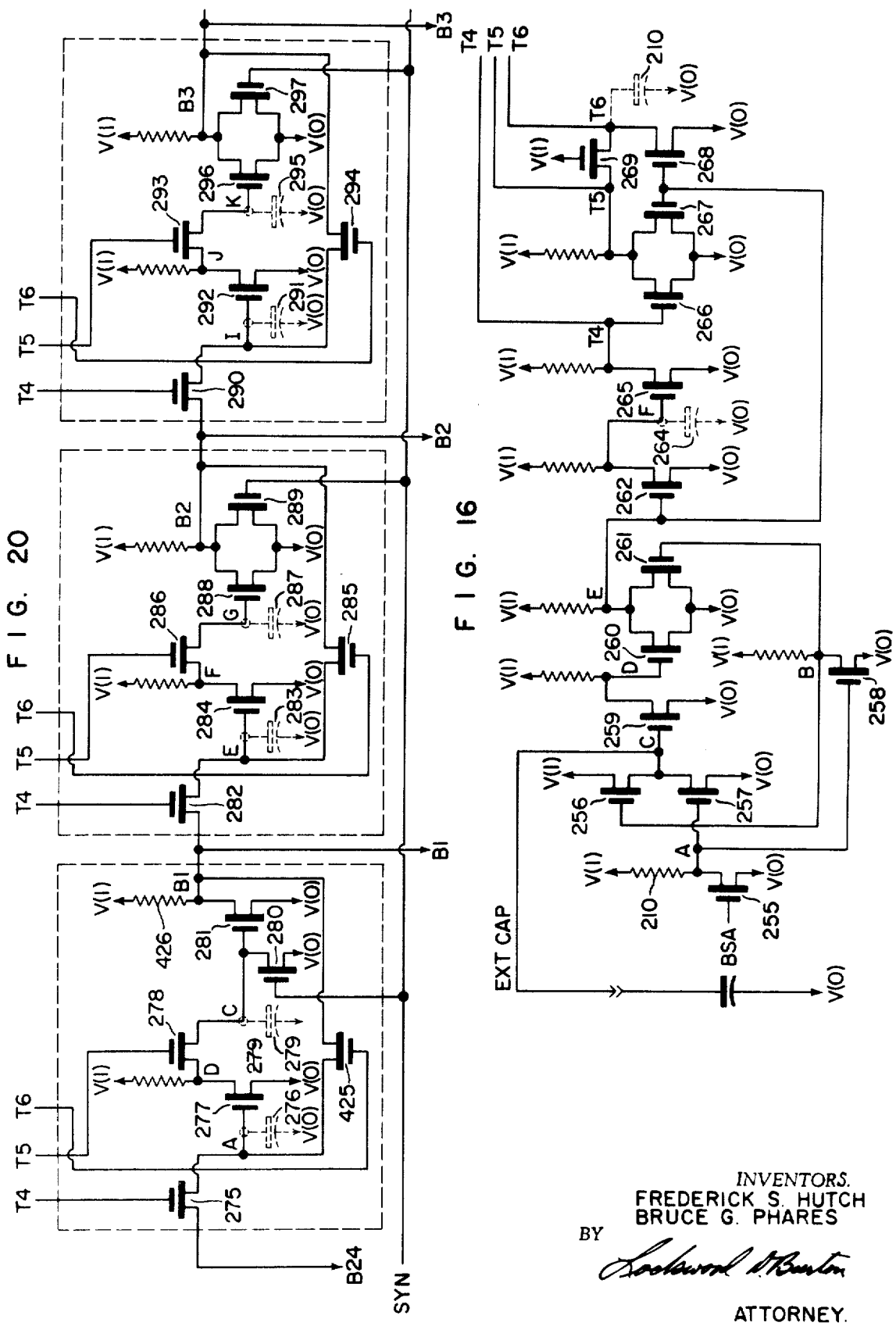

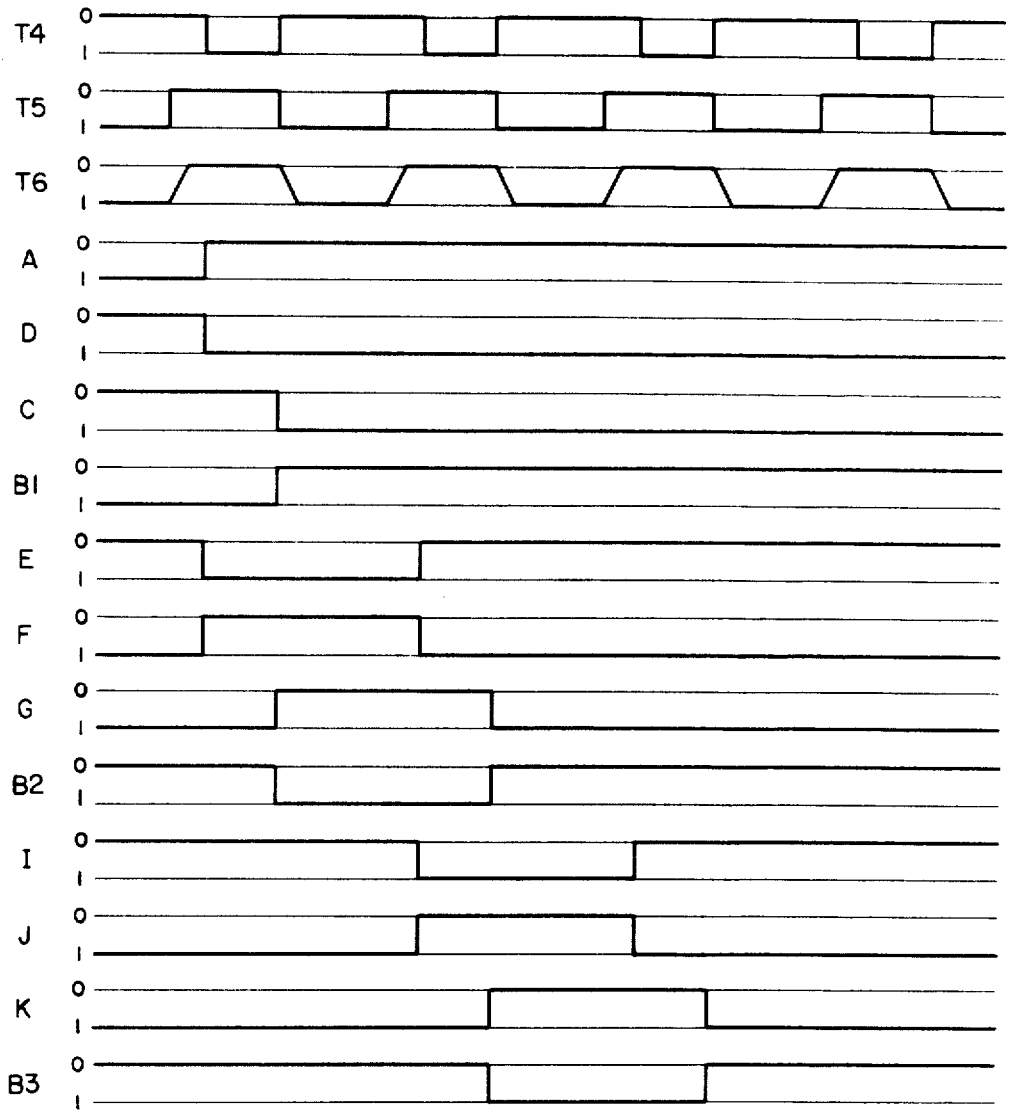

INVENTORS.
FREDERICK S. HUTCH
BRUCE G. PHARES

BY Lockwood D. Burton

ATTORNEY

INVENTORS.
FREDERICK S. HUTCH
BRUCE G. PHARES
BY
Lockwood D. Burton
ATTORNEY

MULTI-POINT RECORDER WITH SOLID STATE PROGRAMMER

The present invention relates to recorders, and more particularly, to an improved multiple point recorder which utilizes digital techniques for programming the recorder operation.

Heretofore, multiple point recorders have been provided which are adapted to produce records of a plurality of phenomena by sequentially scanning a plurality of input circuits then producing indicia representative of the measured variables. In that manner, a separate trace, usually a series of dots, was produced for each of the input signals, each trace being representative of a physical phenomenon. In these prior art recorders, a series of timed pulses was generated for controlling the recorder operation by employing a constant speed timing motor to drive a rotary switching arrangement. Unfortunately, the constant speed of the timing motor used in such recorders necessarily fixed the length of the recording cycle for each of the input points.

A multiple point recorder employing a constant speed timing motor is shown, for example, in U.S. Pat. application Ser. No. 733,506 (U.S. Pat. No. 3576582). The application is assigned to the present assignee; the present invention is an improvement on the multiple point recorder disclosed therein. The recorder of the present invention eliminates the need for a timing motor and by employing digital techniques provides a more versatile, more reliable and less expensive means for programming the recorder operation. With the digital programming of the inproved recorder, the speed of the recorder operation depends on the base frequency of the clock signal used to drive the digital circuitry. Therefore, the speed at which the improved recorder performs a recording cycle, i.e. scans the input points and performs its recording operation, may be conveniently changed by simply changing the base frequency of the clock signal.

It is, accordingly, an object of the present invention to provide an improved multiple point recorder wherein the means for programming the recorder operation are substantially digital in operation.

It is another object of the present invention to provide an improved multiple point recorder as set forth wherein means are included for programming the selection of input points to be processed.

It is further an object of the present invention to provide an improved multiple point recorder as set forth wherein the means for programming the selection of input points are substantially digital in operation.

Still another object of the present invention is to provide an improved control system for a multiple point recorder.

An additional object of the present invention is to provide a more reliable control system for a multiple point recorder.

A further object of the present invention is to provide a multiple point recorder with relatively small power requirements as compared to the prior art multiple point recorders.

Another object of the present invention is to provide a multiple point recorder that is minimal in its physical dimensions.

Yet another object of the present invention is to provide a multiple point recorder with relatively few moving parts.

In accomplishing these and other objects, there has been provided in accordance with the present invention, a multiple point recorder comprising printing means having first and second print members which are electrically actuated to print and record trace marks and trace identifying marks, respectively, on a record member. A digital programmer is provided for programming the scanning of the input channels of the recorder and for selectively actuating the first and second print members to record trace marks and trace identifying marks on the record member. Switch means are incorporated in the digital programmer whereby the input points to be processed may be selectively programmed and whereby the programmed selection may be changed even during recorder operation.

A better understanding of the invention may be had from the following detailed description when read in connection with the accompanying drawings in which:

FIG. 4 is a schematic diagram of the clock gating circuit shown in FIG. 3;

FIG. 6 is a block diagram of the Signal Generator shown in FIG. 3;

FIG. 12 is a logic diagram of the skip Numeral circuit shown in FIG. 3;

FIG. 14 is a logic diagram of the Alarm Enable Signal Generator shown in FIG. 3;

FIG. 16 is a schematic diagram of the Timing Signal Generator shown in FIG. 15;

FIG. 20 is a schematic diagram of blocks B1, B2 and B3 shown in FIG. 18;

FIG. 21 is a waveform diagram showing the changes in logic levels occurring at different points of the schematic diagram shown in FIG. 20;

Figure 1:
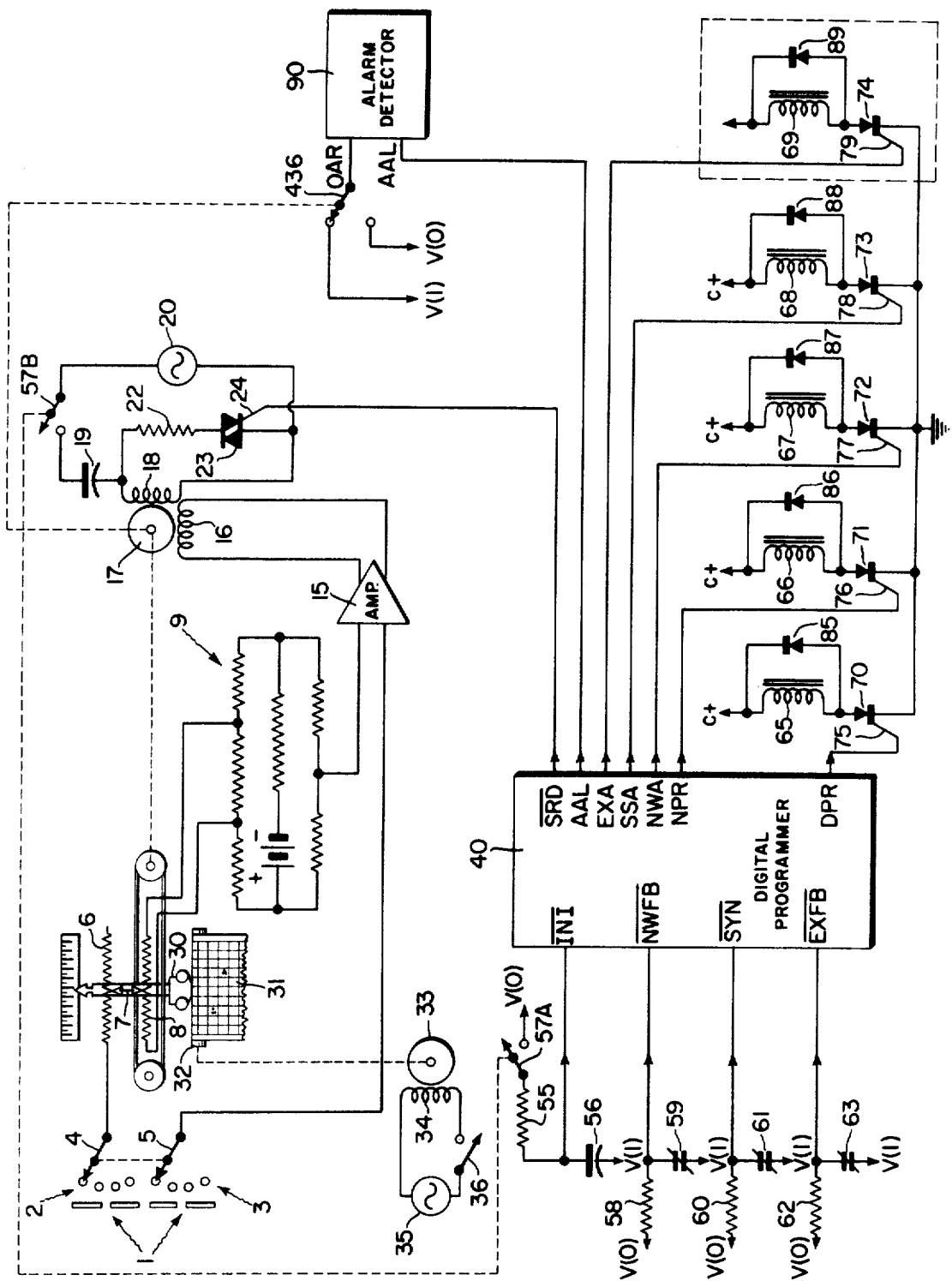
FIG. 1 is a diagram of a multiple point recording instrument according to the present invention.

It is noted at this point that in this specification, the various input and output terminals of the recorder logic circuitry are identified by the logic signals applied thereto or generated thereon. For example an input terminal may be identified by the term "input terminal SRD" (Servo Disable) if the logic signal SRD is applied thereto. A logic 1 indicates a "True" condition and a logic 0 relates a "false" condition. Therefore a voltage representative of a logic 1 condition V(1) (hereinafter "1") is existing at an SRD input terminal, then it means that "it is true that there is a Servo Disable signal present at this terminal;" and if a voltage representative of a Logic 0 condition V(0) (hereinafter "0") is existing at a terminal SRD, then it means that "it is false that there is a Servo Disable signal present at this terminal." It is also noted that a solid line drawn over an expression, negates that expression. Thus $\overline{SRD}$ reads "no servo disable signal is present at this point." Therefore if a voltage representative of a Logic 1 condition is present at an input terminal labelled $\overline{SRD}$, this means that "it is true that no servo disable signal is present at this point;" and if a voltage representative of a Logic 0 condition is present at terminal SRD, then "it is false that no servo disable signal is present at this point." A NOR gate as hereinafter used refers to the logical input condition required in order to produce a logic 1 level at the NOR gate output. For example with a two input NOR gate, the output signal will be at a logic 1 level only when neither input number one nor input number two is at a logic 1 level. The NOR gate therefore designates a multiple input logic element, the output of which is a logic 1 level only when all of its input signals are at a logic 0 level. For any other combination of input signals, a logic 0 will appear as an output.

Symbolically, a NOR gate may be represented in two ways. One representation is shown for example, in FIG. 11 as gate 218. Basically this gate 218 is an AND gate with its input terminals negated. The alternate representation is indicated by gate 217 in FIG. 11. This gate 217 is basically an OR gate with its output terminal negated. Both of these symbolic representations perform the same logic function as hereinbefore described. The manner of symbolic presentation of a NOR gate will be predicated whenever possible by the relationship of the input signals which is required in order to obtain the desired output signal. This method is herein adopted in order to facilitate extracting logic equations from the logic diagrams. Thus in a situation where the occurrence of one signal depends on the simultaneous occurrance of several other signals, the NOR gate will be represented as an AND gate with its input terminals negated such as gate 218 in FIG. 11. In a situation where the occurrence of a signal depends on the occurrence of any one of a number of other signals, the NOR gate will be represented as an OR gate with its output terminal negated such as gate 217 in FIG. 11.

Referring now to the drawings in more detail, there is shown in FIG. 1 a terminal board 1. The terminal board 1 comprises a plurality of input terminal pairs, each pair having terminals 2 and 3. 24 input terminal pairs were used in a recording instrument constructed in accordance with the present invention, thereby providing 24 input channels. Selectively, each pair of terminals 2 and 3 are sequentially scanned and sensed by ganged movable contacts 4 and 5, respectively. The movable contact 4, is connected through a slide wire resistor 6, a slide wire contactor 7, a slide wire resistor 8 and a measuring circuit 9 to a first of two input terminals of a servo amplifier 15. The second input terminal of the amplifier 15 is connected to the movable contact 5.

Connected across the output terminals of the amplifier 15 is a load comprising a conductive coil 16. The coil 16 is the control winding of a servo motor 17. A line winding 18 of the motor 17 is connected in series with a capacitor 19. An A.C. power supply 20 is connected through an OFF-ON switch 57B across the series connected capacitor 19 and coil 18. A resistor 22 is connected in series with a triac 23, the series connected resistor 22 and triac 23 being connected in shunt across the coil 18. The triac 23 has a control electrode 24 and as is hereinafter explained, acts as an electronic switch for controlling the operation of the servo motor 17.

A printing carriage 30 is positioned over a record member 31 and carries first and second printing means comprising a trace marker and a trace identifying marker, respectively. The respective printing means, whose operation and construction are described at a later point in the specification, are operative when actuated to print upon a record member 31, a plurality of record traces with identifying marks to correspond to the several input signals sensed and recorded. FIG. 1 shows two exemplary record traces printed on the record member 31, the traces having trace marks in the form of dots and trace identifying marks in the form of numerals. The record member 31 is a strip type recording chart and is coupled by driving means 32 to a chart drive motor 33. A winding 34 of the motor 33 is connected across an A.C. power supply 35 through an OFF-ON switch 36.

A digital programmer 40 has input terminals $\overline{INI}$, $\overline{NWFB}$, $\overline{SYN}$ and $\overline{EXFB}$. The input terminal $\overline{INI}$ is connected to the point of common connection between a resistor 55 and a capacitor 56. The resistor 55 and the capacitor 56 are series connected from a voltage representative of a logic 0,V(0), to a voltage representative of a logic 1,V(1), respectively. A contact 57A of the ON-OFF switch 57 is connected between the resistor 55 and V(0). The movable contact 57A is ganged with the movable contact 57B which is in the servo motor power circuit. A resistor 58 is connected in series with a normally closed switch 59 between V(0) and V(1), the resistor 58 being connected to V(0) and the switch 59 being connected to V(1). The common point of connection between the resistor 58 and the switch 59, is connected to the input terminal $\overline{NWFB}$. Similarly, a resistor 60 is connected in series with a switch 61 between a logic 0 voltage V(0), and a logic 1 voltage V(1). A resistor 62 is connected in series with a switch 63 between V(0) and V(1). The common point of connection between the resistor 60 and the switch 61 is connected to the $\overline{SYN}$ input while the common point of connection between the resistor 62 and the switch 63 is connected to the input terminal $\overline{EXFB}$.

The digital programmer 40 has output terminals $\overline{SRD}$, AAL, EXA SSA, NWA, NPR, and DPR. The $\overline{SRD}$ output terminal is connected to the triac control electrode 24, and the AAL output terminal is connected to one input of an Alarm Detector 90. The other input of the Alarm Detector 90 is connected through a switching means 436 to either a logic 1 voltage or a logic 0 voltage. The switching means 436 is controlled by the position of the servo motor 17. Solenoids 65–69 are shown connected between C+ voltage and the anode terminals of silicon controlled rectifiers (SCR) 70–74 respectively. The cathode terminals of the SCRs 70–74 are connected to ground. The SCRs 70–74 have control electrodes 75–79, respectively. The SCR control electrodes 75–79 are connected, respectively, to the programmer output terminals DPR, NPR, NEA, SSA and EXA. Diodes 85–89 are respectively connected, across the solenoids 65–69 so as to dissipate the energy of the back electromotive force generated whenever an energized solenoid is deenergized.

Figure 2:
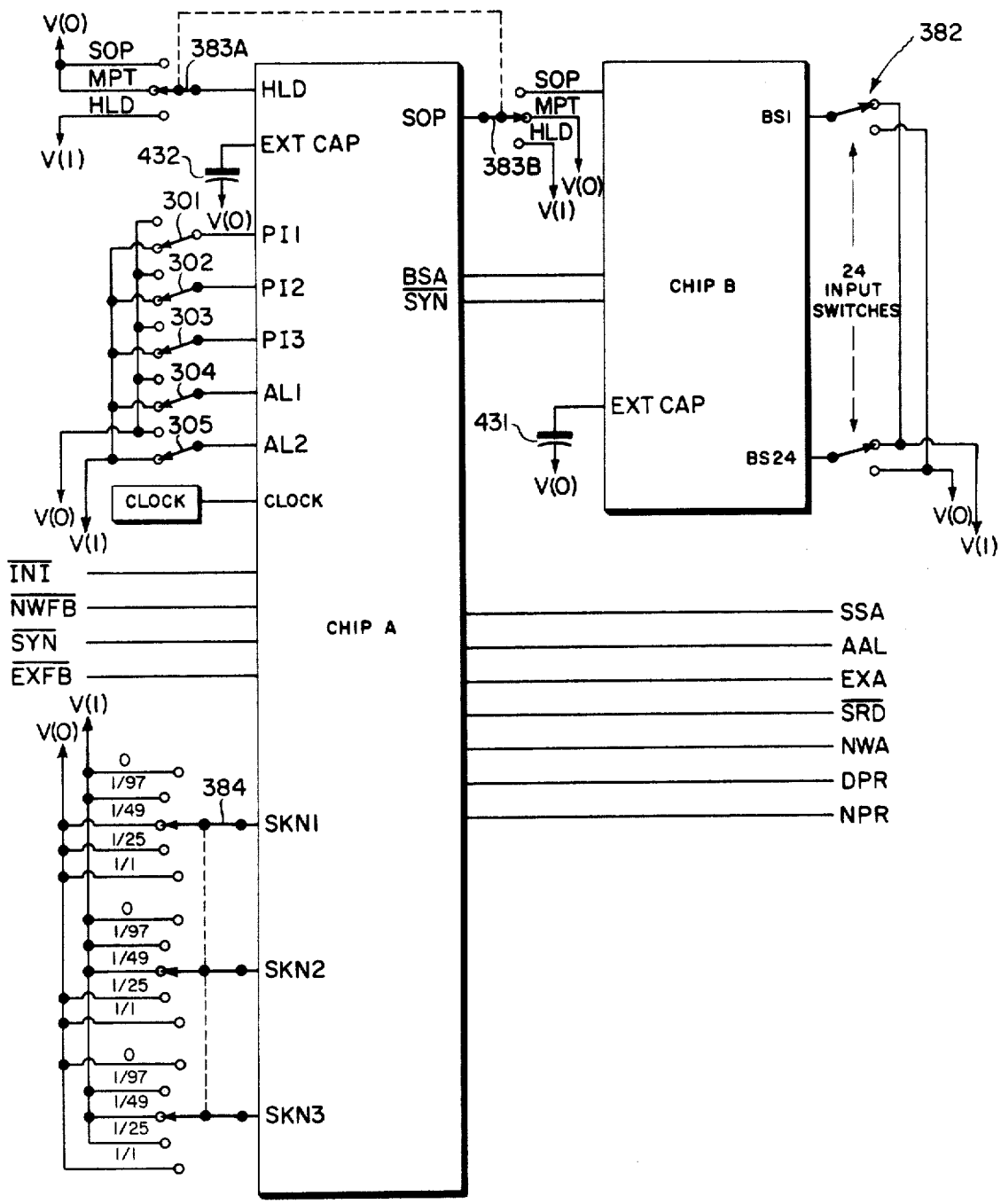
FIG. 2 is an interconnection diagram of two integrated circuit chips comprising the DIGITAL PROGRAMMER shown in FIG. 1.

Referring to FIG. 2, there is shown in more detail the digital programmer 40 of the exemplary embodiment of the present invention. Chip A has inputs of EXTCAP, Clock, $\overline{INI}$, $\overline{NWFB}$, $\overline{SYN}$, and $\overline{EXFB}$. In addition to these Chip A has inputs PI1, PI2 and PI3 which are connected to mutually independent switching means 301, 302 and 303, operable to apply either a logic 1 or a logic 0 to any one of inputs PI1, PI2 or PI3. The AL1 and AL2 inputs to Chip A are connected to individual switches 304 and 305 capable of presenting either of the two logic states to either switch. The 5 position triple pole rotary switch 384 allows Chip A inputs SKN1, SKN2 and SKN3 to be codedly presented in terms of logic state combinations.

Movable contact 383A selects the signal presented to the HLD input to chip A. Thus, when movable contact 383A is on stationary contact SOP or stationary contact MPT, the signal presented is a logic 0. When the movable contact 383A is connected to the HLD stationary contact, the signal presented to the HLD input of chip A is a logic 1. Movable contact B of switch 383 selects the signal presented to the SOP input of chip A. When the movable contact B of switch 383 is on the stationary contact HLD, the signal presented to the SOP input is a logic 0. When the movable contact B is connected to the MPT terminal, the input signal is a logic 0. When the movable contact 383B is resting on the SOP position, the signal presented to the SOP input of chip A is the SOP output chip B.

Chip A also has an input terminal EXTCAP which is connected through a capacitance 432 to the logic bus.

Signals SSA, AAL, EXA, $\overline{SRD}$, NWA, DPR, and NPR all outputs of chip A, are run directly to output terminals of the digital programmer 40. Chip A outputs BSA and SYN run directly to correspondingly labelled input terminals of chip B. Chip B also has an input terminal EXT. CAP which is connected through an external capacitance 431 to the logic 0 bus. Finally, chip B inputs BS1 to BS24 are connected to an independent switching means 382. Through switching means 382, either a logic 0 or logic 1 may be presented to any of chip B input terminals BS1 to BS24.

Figure 3:
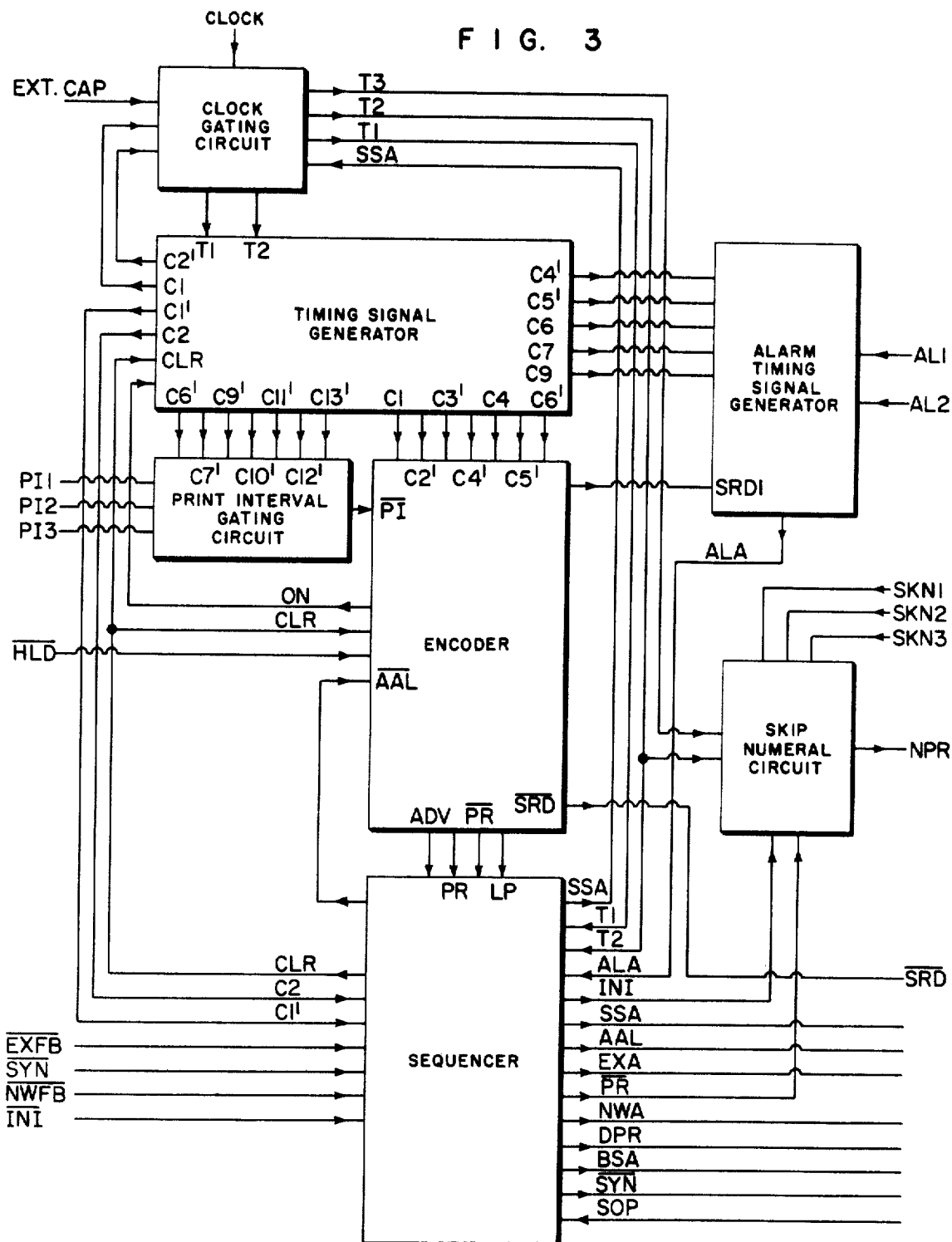
FIG. 3 is a block diagram of "chip A" shown in FIG. 2.

FIG. 3 is a block diagram of the circuits comprising chip A with their inputs and outputs. The Clock Gating Circuit has an external input EXT CAP. The clock gating circuit inputs of C2' and C1 come from a Timing Signal Generator. Another external input signal is a CLOCK signal. Input signal SSA is received from a sequenser. The clock gating circuit has three outputs T1, T2 and T3. The T1 and T2 outputs of the Clock Gating Circuit go to the Sequenser, and signal T2 additionally goes to a Skip Numeral Circuit. The T3 output of the Clock Gating Circuit goes soley to the Skip Numeral Circuit. T1 and T2 outputs of the Clock Gating Circuit are also connected to input terminals of the Timing Signal Generator block. Timing Signal Generator Input CLR comes from the Sequenser and input ON comes from the Encoder. Timing Signal Generator outputs C1' and C2 are connected to the Sequenser. Output C4', C5', C6, C7 and C9 all run to the Alarm Signal Generator block. Output C1, C2', C3', C4' ,C4,C5', C6' all run to the Encoder. Finally outputs C6', C7', C9', C10', C11', C12' and C13' run to a Print Interval Gating Circuit. In addition to the above inputs, the Print Interval Gating Circuit has inputs PI1, PI2 and PI3. The Print Interval Gating Circuit has a single output of $\overline{PI}$ which is connected to the Encoder.

The Encoder also has inputs of CLR and HLD. The CLR output to the Encoder, comes from the Sequenser, and the HLD input is an external input. As mentioned before, the Encoder also has inputs of C1, C2', C3', C4', C4, C5' and C6' from the Timing Signal Generator. The Encoder receives input $\overline{AAL}$ from the Sequenser. As outputs, the Encoder has SRD1 which is connected to the alarm signal generator; outputs PR, $\overline{PR}$, ADV and LP are connected to the Sequenser; Encoder output $\overline{SRD}$ runs to a chip A external terminal $\overline{SRD}$. The remaining output of the Encoder block is designated as ON. This terminal is connected to the Timing Signal Generator.

The Sequenser has external inputs of $\overline{EXFB}$, $\overline{SYN}$,NWFB,INI, and SOP. Other inputs include C1' and C2 from the Timing Signal Generator, BR, $\overline{BR}$, BDV and LP from the Encoder, T1 and T2 from the Clock Gating Circuit, ALA from the Alarm Signal Generator and SOP from external input SOP. As outputs the Sequenser has $\overline{AAL}$ to the Encoder, CLR to the Encoder and to the Timing Signal Generator, SSA to the Clock Gating Circuit; and INI and $\overline{PR}$ to the Skip Numeral Circuit. In addition to these, the Sequenser has outputs SSA, AAL, EXA, NWA, DPR, BSA, and $\overline{SYN}$ all of which run to output terminals of chip A.

The Alarm Timing Signal Generator has inputs of C4', C5', C5, C7 and C9 from the Timing Signal Generator, and SRD1 from the Encoder. The Alarm Timing Signal Generator block also has external inputs of AL1 and AL2. The output signal ALA of the Alarm Signal Generator is connected to the Sequenser.

The Skip Numeral Circuit has inputs of C1' and C2 from the Clock Gating Circuit, and input INI from the Sequenser. In addition to these, the Skip Numeral Circuit receives external inputs SKN1, SKN2 and SKN3. Its output signal, NPR, is connected to output terminal NPR of Chip A.

FIG. 4 shows a schematic diagram of the Clock Gating Circuit represented in block diagram in FIG. 3. The CLOCK input is connected to the gate terminal of a metal oxide semiconductor field-effect transistor (MOSFET 101. The MOSFET is a symmetrical device, i.e. current will flow through the MOSFET in either direction upon the application of the proper control signal on the gate terminal of the MOSFET. The MOSFET is the basic device used throughout the examplary embodiment of the present invention to accomplish the various switching and gating requirements. Basically, it is a three-terminal device which can be treated as a controllable switch. The gate terminal opens and closes the switch.

In the examplary embodiment of the present invention it is to be noted that a voltage representative of a logic on (1) when presented at the gate terminal of the MOSFET, will close the switch and thereby allow a signal to pass through the device. If a voltage representative of a logic zero (0) is applied to the gate terminal, the switch will open and a signal will not be able to pass. The drain terminal of the MOSFET 101 is connected to a logic zero bus,and the source terminal is connected through a resistor to a logic 1 bus. The source terminal of the MOSFET 101 is also connected to the gate terminal of MOSFET 102. The drain terminal of MOSFET 102 is connected to a logic 0; the source terminal is connected to a junction point A, then through a resistor to a logic 1. The junction A is also connected to the gate terminals of MOSFETs 130 and 105. The drain terminals of MOSFETs 103 and 105 are connected to a logic 0. The source terminal of MOSFET 103 is connected to a junction B, then through a resistor to a logic 1. The junction B is also connected to the gate terminal of MOSFET 104 and the gate terminal of MOSFET 108. The source terminal of MOSFET 104 is connected to a logic 1. Its drain terminal is connected to a common point C connecting the source terminal of MOSFET 105, an external capacitor EXT CAP, and the gate terminal MOSFET 106. The drain terminal of MOSFET 106 is connected to a logic 0; the source terminal is connected to a junction D, then through a resistor to a logic 1 and to the gate terminal of MOSFET 107. The drain terminals of MOSFET's 107 and 108 are connected in common to a logic 0; their respective source terminals are connected together to a junction E, then through a resistor to a logic 1. The common point E is also connected to the gate terminal of MOSFET 109 and the gate terminal of MOSFET 117. The drain terminal of MOSFET 109 is connected to a logic 0; its source terminal is connected through a resistor to logic 1 and also to a common point T1' connecting the gate terminal of MOSFET 112 and the gate terminal of MOSFET 110. The common point T1' is also connected through a built-in capacitance 111 to logic 0. The drain terminal of MOSFET 110 is connected to a logic 0; its source terminal is connected to a junction T1, then through a resistor to logic 1 and to the gate terminal of MOSFET 116. The junction T1 also comprises an output terminal of the circuit. The drain terminal of MOSFET 116 is connected in common with the drain terminal of MOSFET 117 to a logic 0. Their respective source terminals are connected together to a terminal T2 and through a resistor to a logic 1. The terminal T2 also comprises another output terminal of the circuit.

The drain terminal of MOSFET 112 along with the drain terminals of three other MOSFETS 113, 114 and 115 are connected together and to the logic 0. The gate terminal of MOSFET 113 is connected to an input C1. The gate terminal of MOSFET 114 is connected to an input C2'. The gate terminal of MOSFET 115 is connected to an input SSA. The source terminals of the four MOSFET's 112, 113, 114 and 115 are all connected together to an output terminal T3 and through a resistor to a logic 1.

Figure 5A:
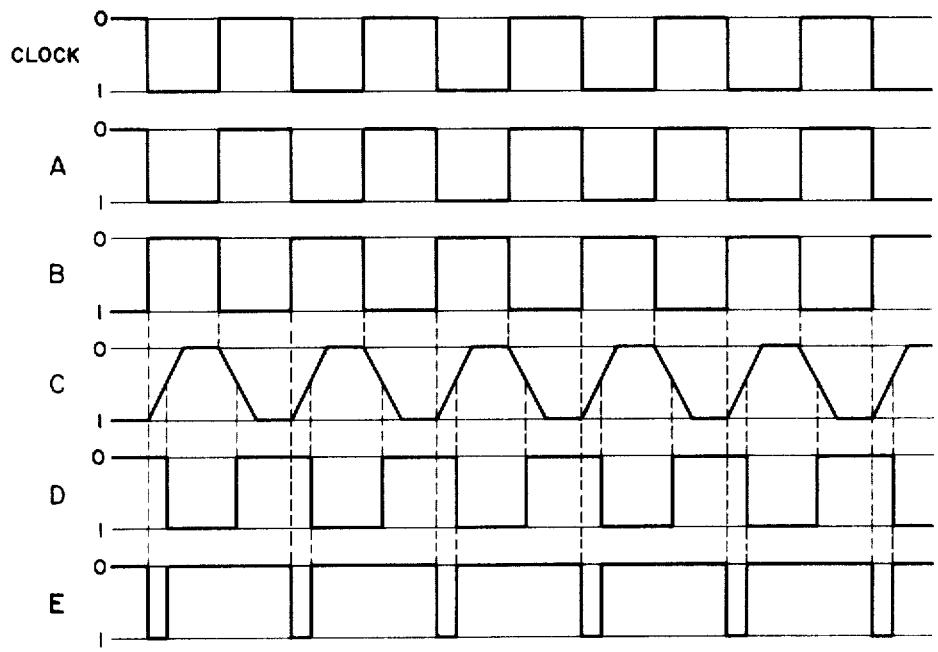
FIG. 5A and FIG. 5B are waveform diagrams showing the changes in logic levels occurring at different points of the gating circuit of FIG. 4.
Figure 5B:
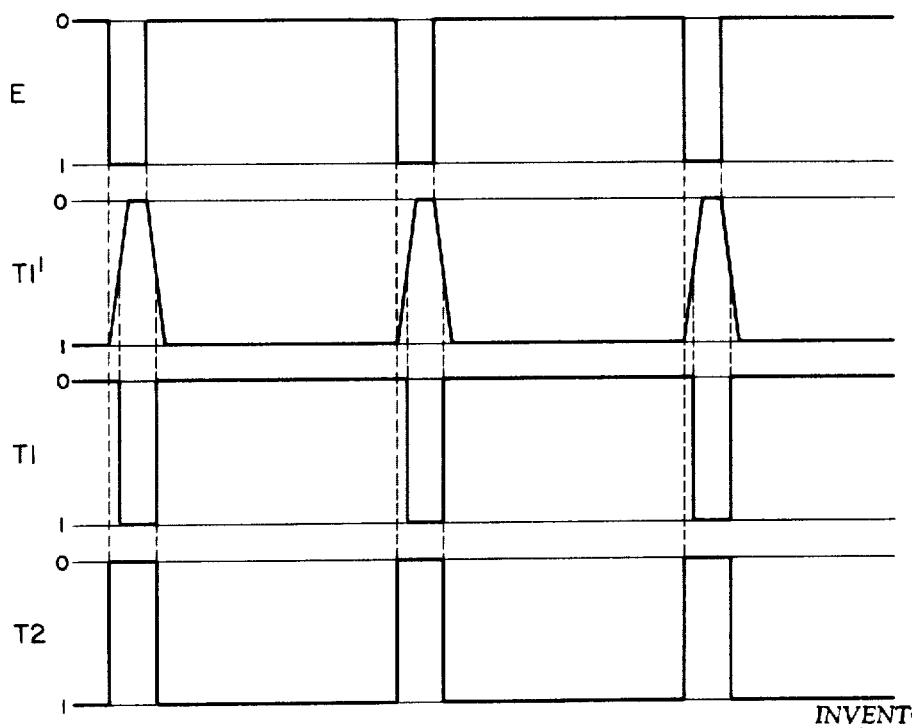

In FIGS. 5A and 5B, there are shown the waveshapes of the signals appearing at the designated points called out in FIG. 4. The waveshape of the clock signal is a square wave alternating between a logic 0 level and a logic 1 level at the preselected frequency of the clock signal generator. MOSFET's 101 and 102 act as invertors and therefore the waveshape of the signal at point A follows the waveshape of the clock signal. When the logic level at point A is a zero, MOSFET 103 is open, no current flows therethrough and the logic level at point B is a 1. At this same instant in time point C is at a logic 1 since the logic 1 at point B closes the MOSFET switch 104 which connects point C with a logic 1. The logic 0 at point A keeps the MOSFET switch 105 open thereby disconnecting point C from a logic 0. With point C at logic 1, MOSFET 106 is closed, resulting in a logic 0 at point D. When point D is at a logic 0 and point B is at a logic 1, point E will be in a logic 0; a logic 1 at either point D or point B will close either MOSFET switch 107 or MOSFET switch 108, respectively, thereby causing point E to go to a logic 0. With point E initially at a logic 0, point T1' is a a logic 1; a logic 0 at point E applies a logic 0 to the gate terminal of MOSFET switch 109 and therefore that switch is open. Since MOSFET switch 109 is open, no current flows therethrough and the point T1' is connected to the logic 1 voltage level. The logic level 1 at point T1' closes MOSFET switch 110 and connects the point T1 through MOSFET 110 to logic 0. With the logic level at point E and T1 at 0 neither MOSFET switch 116 nor MOSFET switch 117 will be conducting, and therefore the least resistive path presented to point T2 is through the relatively small resistance to the logic 1 voltage. The logic level present at point B will be effectively an inversion of the logic level present at point A, therefore, the waveform at point B will be an inversion of the waveform appearing at point A. Because of the external capacitance EXTCAP connected to point C, the logic level of point C will not immediately follow a change in logic level at point B. The external capacitance will cause an RC time delay so that the logic level at point C will not immediately change states with a change in logic levels at point B but will lag this logic level change by a period of time which is a function of the time delay introduced by the external capacitance. Although the actual rate of logic level change at point C is exponential in nature, it is shown in FIG. 5 as a linear change in order to facilitate the explanation of the waveshapes occurring at points in the circuit. When the logic level at point B changes from a 1 to a 0, the logic level at point C begins to change from a 1 to a 0 but does not arrive at a logic 0 level until a short time delay after point B reaches a logic 0. Similarly when the logic level at point B changes from a 0 to a 1 the logic level at point C begins to change from a 0 to a 1 but does not actually reach the logic 1 level until a certain period of time after point B reaches the logic level. At some voltage level between the change from a logic 1 voltage level to a logic 0 voltage level at point C, MOSFET switch 106 is triggered "off" and a logic level at point D will go to a logic 1. Similarly, at some point during the changing of states from a logic 0 to a logic 1 at point C, MOSFET switch 106 will be triggered into conduction and point D will go to a logic 0. The logic level at point E will be a logic 1 only when the logic levels at point D and point B are at 0. The logic level at point E will be at a logic 0 at all other times. The time during which point B and point D are at a logic 0 is only that short period between the time the logic level at point B goes from a 1 to a 0 and MOSFET switch 106 is triggered out of the conduction state. When MOSFET switch 106 is triggered "off" the logic level at point D goes to a 1, thereby closing MOSFET switch 107 and presenting a low resistance path between point E and a logic 0. The short duration logic 1 pulse produced at point E is shown on an expanded scale in FIG. 5.

There is built into the clock gating circuit an intrinsic capacitance 111 shown in phantom in FIG. 4 connected between the source terminal of MOSFET gate 109 and the logic zero bus. This intrinsic capacitance acts in a manner similar to that of the external capacitance connected to point C in FIG. 4, in that it delays the response of point T1' to point E. Therefore, when point E changes states from a logic 0 to a logic 1, point T1' begins to change states from a logic 1 to a logic 0 but does not arrive at a logic 0 level until a short time after point E arrives at a logic 1 level. Similarily, the logic level at T1' begins to change states from a 0 to a 1 when E changes state from a 1 to a 0 but T1' does not arrive at a logic 1 level until a short time delay after point E arrives at a logic 0 level. At some time during the gradual change of state between a 1 and a 0 of point T1', MOSFET switch 110 is triggered out of conduction. When MOSFET switch 110 opens, the logic level at point T1 changes from a 0 to a 1. The logic level at point T2 will be at a logic 0 at all times except when the logic level is present at point T1 and E are 0 at the same time. In the latter case MOSFET switches 116 and 117 are both nonconducting and the path to a logic 1 is the least resistant path presented to point T2. Signal T3 is the signal T1', further conditioned by the signals C1, C2' and $\overline{SSA}$.

The timing signal generator block of FIG. 3 is shown in more component detail in FIG. 6. Thirteen memory devices 120-132 are shown with their interconnections, inputs and outputs. T1, T2 and CLR are common inputs to each memory device on 120-132. The first memory device 120 has an additional input ON. This Memory device 120 also has two outputs one designated a C1 and the other as C1'. These outputs are connected to two inputs of the next memory device 121 and are also brought out as outputs of the signal generator shown in FIG. 3. The other twelve memory devices 121-132 are connected in cascade each taking two of their inputs from the outputs of the proceeding memory device. Each memory device has two output terminals. The output terminals of the first memory device 120 are labelled C1 and C1'. Similarily, the outputs of the third memory device 122 are labelled C3 and C3'. The memory devices 120-132 resemble flip-flops in nature except that the outputs are not completely complimentary, that is both outputs of one device are not necessarily at different logic levels at any one time. Therefore, the outputs for example of the first memory device 120 are labelled C1 and C1' rather than C1 and $\overline{C1}$. The available outputs are C1 and C1' from the first memory device 120, C2 and C2' from the second device 121, C3' from the third device 122, C4 and C4' from the fourth device 123, C5' from the fifth device 124, C6 and C6' from the sixth device 125, C7 and C7' from the seventh device 126, C9 and C9' from the ninth device 128, C10 from the tenth device 129, C11' from the eleventh device 130, C12' from the twelth device 131, and C13' from the thirteenth device 132. Other output signals C3, C8 and C8' for example, are also obtainable from the Timing Signal Generator but are not required for the operation of the exemplary embodiment of the present invention.

Figure 7:
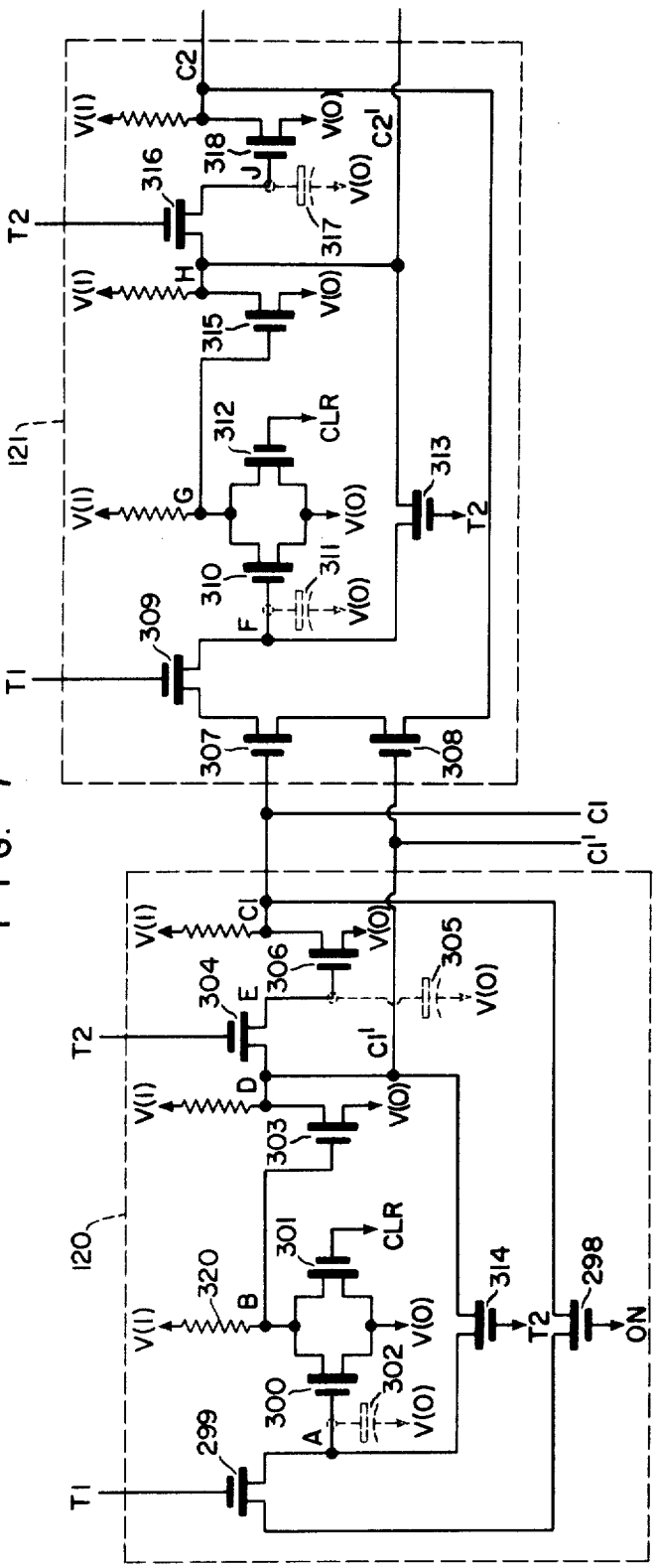
FIG. 7 is a schematic diagram of the first two blocks of the generator shown in FIG. 6.

FIG. 7 shows the MOSFET's comprising the first two memory devices 120 and 121 represented in block form in FIG. 6. The input terminal ON is connected to the gate terminal of MOSFET switch 298. The drain terminal of MOSFET 298 is connected to the source terminal of MOSFET 306. The source terminal of MOSFET 298 is connected to the source terminal of MOSFET 299. Input T1 is connected to the gate terminal of MOSFET 299 and its drain terminal is connected to a common point connecting the source terminal of MOSFET 314 with the gate terminal of MOSFET 300. An intrinsic, (built into the chip) capacitance 302 is connected between the gate terminal of MOSFET 300 and the logic 0 bus. The drain terminal of the MOSFET 300 is connected to the drain terminal of MOSFET 301 and also to the logic 0 bus. The source terminals of MOSFET's 301 and 300 are connected together and, through a resistor 320, to the logic 1 bus. The source terminals of MOSFET's 301 and 300 are also connected to the gate terminal of MOSFET 303. The drain terminal of MOSFET 303 is connected to the logic 0 bus; its source terminal is connected through a resistor to the logic 1 bus. The drain terminal of MOSFET 303 is also connected to a common point connecting the source terminal of MOSFET 308, and the drain terminal of MOSFET 314. Input T2 is connected to the gate terminal of MOSFET 304; its drain terminal is connected to the gate terminal of MOSFET 306 and also through an intrinsic capacitance 305 to the logic 0 bus. The drain terminal of MOSFET 306 is connected to the logic 0 bus; its source terminal is connected through a resistor to the logic 1 bus. The source terminal of the MOSFET 306 also connected to a common point connecting the gate terminal of the MOSFET 307 and the drain terminal of MOSFET 298. Input signal CLR is applied to the gate terminal of the MOSFET 301.

The second memory device 121 has two of its input terminals connected to the two output terminals of the proceeding memory device 120. Input C1 is connected to the gate terminal of MOSFET 307 and input C1' is connected to the gate terminal of MOSFET 308. The source terminal of MOSFET 308 is connected to the drain terminal of MOSFET 307, while the drain terminal of MOSFET 308 is connected to the source terminal of MOSFET 318. The source terminal of MOSFET 307 is connected to the source terminal of MOSFET 309. The input T1 is connected to the gate terminal of MOSFET 309. The drain terminal of MOSFET 309 is connected to a common point connecting the gate terminal of MOSFET 310 and the source terminal of MOSFET 313. An intrinsic capacitor 311, shown in phantom in FIG. 7, is connected between the gate terminal of MOSFET 310 and the logic 0 bus. The drain terminals of MOSFETs 310 and 312 are connected together and to the logic 0 bus. The source terminals of MOSFETs 310 and 312 are connected together and to a common point connecting the logic 1 bus through a resistor, and also to the gate terminal of MOSFET 315. The signal CLR is connected to the gate terminal of MOSFET 312. The drain terminal of MOSFET 315 is connected to the logic 0 bus; its source terminal is connected through a resistor to the logic 1 bus. The drain terminal of 315 is also connected to a common point H connecting a drain terminal of MOSFET 316 and the drain terminal of MOSFET 313. Output C2' of the second memory device 121 is also taken from this point H. Input T2 is connected to the gate terminal of MOSFET 316 and its source terminal is connected to the gate terminal of MOSFET 318. An intrinsic capacitor 317 is connected between the gate terminal of the MOSFET 318 and the logic 0 bus. The drain terminal of MOSFET 318 is connected to the logic 0 bus; its source terminal is connected, through a resistor, to the logic 1 bus, and to the drain terminal of MOSFET 308. The output C2 is also connected to the source terminal of MOSFET 318. The gate terminal of MOSFET 310 is designated as point F. Point G is located at the gate terminal of MOSFET 315. The source terminal of MOSFET 315 is indicated as point C2'. Point J is located at the gate terminal of MOSFET 318. The source terminal of MOSFET 306 is point C1, and the gate terminal of MOSFET 306 is point E. Point C1' is indicated as the source terminal of MOSFET 303. The gate terminal of MOSFET 300 is point A, and the gate terminal of MOSFET 303 is point B.

Figure 8:
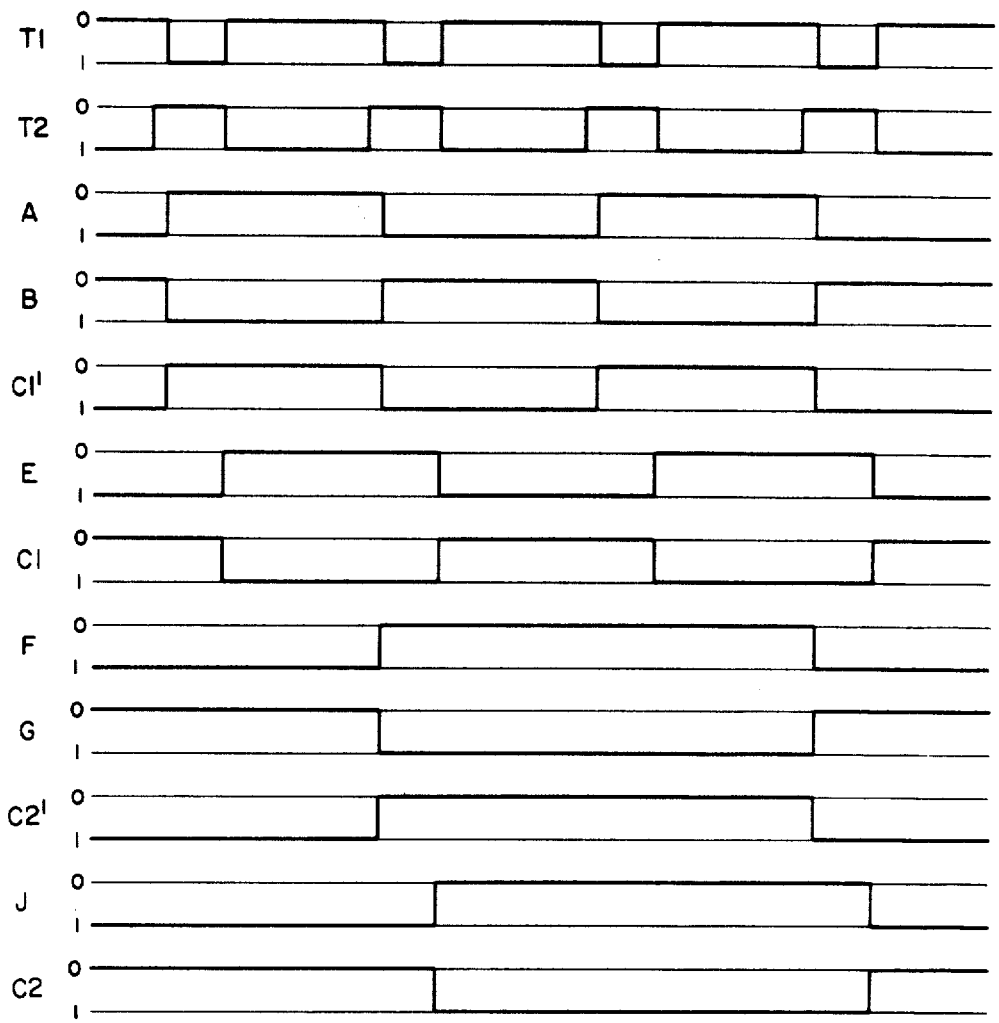
FIG. 8 is a waveform diagram showing the changes in logic levels occurring at different points of the signal generator circuit shown in FIG. 7.

Referring to FIG. 8, there are shown the waveshapes of the various signals appearing at the different points of FIG. 7. The signals T1 and T2 are the same as previously discussed in connection with FIG. 5; these are shown as the first two waveshapes of FIG. 8. In FIG. 7, assuming a CLR signal has just been generated, point B will go to a logic 0. When B goes to a logic 0, point C1' will go to a logic 1. Since signal T2 is normally at a logic 1, MOSFET switch 314 will be closed, and the logic 1 level from point C1' will be fed back to point A. The logic 1 at point A will maintain MOSFET switch 300 in the conducting state and CLR may be removed. Since point C1' and signal T2 are both at a logic 1 level, point E must be in a logic 1 level. When point E is at a logic 1, the MOSFET switch 306 is closed and point C1 is thereby connected to the logic 0 bus. The same procedure may be followed to arrive at the initial logic levels present at the various points of memory device 121.

In FIG. 7 there are shown in phantom four capacitors 302, 305, 311 and 317. They are shown in phantom because they are not distince elements but rather have been built into the integrated circuit chip A by controlling the physical location and size of the terminals to which they are connected. The purpose of these capacitances is to maintain a predetermined logic level at their point of connection in the circuit, for a short period of time after the signal applying a logic level thereto has been removed. For example, assume that the logic level present at point C1' is a 1. Also assume that C2 is at a logic 1 so that MOSFET switch 304 is closed and point E is directly connected to point C1'. If point C1' is at a logic 1 level, point E will also be at a logic 1 level. Now assume that T2 goes to a logic 0 and therefore MOSFET switch 304 opens. Next assume the logic level at point C1' changes state from a 1 to a 0. Since MOSFET switch 304 is open, point E will not change states with C1', but due to the built-in capacitance 305 the logic level initially present at point E (logic 1) will be maintained. When MOSFET switch 304 is open, there is a relatively high resistance between point E and point C1'. Upon the change of state at point C1', the built in capacitance 305 will not allow point E to change states immediately but rather will impose an RC time delay. Since the resistance of MOSFET switch 304 is relatively high when the switch is open, the RC time delay prescribed by the built-in capacitor 305 does not allow the logic level at point E to change. A short time later, signal T2 goes to a 1 and thereby closes MOSFET switch 304. This eliminates the high resistance between point E and C1', allowing the point E to assume the logic level present at point C1'. A similar analysis of the effect of the built-in capacitance 302 can be made. Assuming MOSFET switch 299 is closed and MOSFET switch 298 is closed, the logic level present at point C1 is applied to point A. Now, if MOSFET switch 299 opens, a high resistance is introduced into this circuit. Thereafter when the logic level of point C1 changes states, the logic level at point A will not immediately follow because of the large RC time delay introduced by the built-in capacitor 302 and the high resistance of the open MOSFET switch 200. The built-in capacitance 302 holds the logic level that was present at point C1 before MOSFET switch 299 opened. This logic level will be maintained by the built-in capacitance 302 until MOSFET switch 299 closes thereby establishing a low resistance path from point A to point C1. Now remembering that the logic level of point C1 changed while MOSFET switch 299 was open, the logic level at point A will change states and assume the logic level present a point C1. Thus the built-in capacitance 302 has the effect of not allowing the logic level at point A to follow a change in state of the logic level at point C1 until the occurrence of a T1 signal going from zero to one. After a CLR signal has established the initial logic levels of the various points of the circuit illustrated in FIG. 7, as shown in FIG. 8, the Timing Signal Generator input signal change occurs when C2 goes to a logic 0. That change effectively disconnects point C1' from point E, and disconnects point A from point C1'. However, the signal does not cause any logic level change at any point in the circuit of FIG. 7. The next input signal change of state occurs when T1 goes from a 0 to a 1. As previously explained, that change of state causes point A to shift to the logic level present at point C1. Therefore, A goes from a 1 to a 0. When the logic level at point A goes to a 0, MOSFET switch 300 is opened, thereby disconnecting point B from the logic 0 bus. Therefore, the path of least resistance presented to point B is relatively small resistance 320 to the logic 1 bus. Consequently, when A goes from a 1 to a 0, B goes from a 0 to a 1. By a similar inversion process, when B goes from a 0 to a 1, C1' goes from a 1 to a 0. Point E however, is unaffected at that time since the logic level of T2 is 0 and MOSFET switch 304 is open. As previously explained, point E will be maintained at the logic level present at point C1' before MOSFET switch 304 was opened. Since E remains at a logic 1 and point C1 is an inversion of the logic level present at E, C1 will remain at a logic 0.

Point F will also be unaffected at that time since, to effect a change in a logic level at point F, it is required that MOSFET switches 308, 307 and 309 all be closed at the same time. In other words, signal C1, C1' and T1 must all be a logic 1 at the same time and, although T1 has gone to a logic 1,both C1 and C1' are a logic 0. The next input change of state occurs when T1 goes to a 0 and T2 goes to a 1. As previously explained, the logic level at point A remains unchanged due to the built in capacitance 302. Since A is unchanged, both B and C1' are also unchanged. Point E however will shift to the logic level present at point C1' upon the closure of MOSFET switch 304 which closure was caused by T2 going to a logic 1. Therefore, the logic level at E will go from a 1 to a 0. Since C1 is equal to E inverted, when E goes from a 1 to a 0, C1 goes from a 0 to a 1. Again, the logic level at point F is unaffected since C1' is still at 0. The next change of state of an input signal occurs when T2 goes from a 1 to a 0. Again this change of state does nothing but disconnect point C1' from point E and also point A from point C1'. The next timing signal change is T1 going from a 0 to a 1. This causes MOSFET switch 299 to close and therefore forces point A to shift the logic level present at point C1. Therefore, the logic level at point A will go from a 0 to a 1. Consequently, the logic level at point B goes from a 1 to a 0 and the logic level at point C1' goes from a 0 to a 1. The logic level at point E will be unaffected since T2 is at a logic 0 and therefore MOSFET gate 304 is open and the built-in capacitance 305 holds the logic level present at point E before MOSFET switch 304 opened. Since the logic level at point E does not change, the logic level at point C1 also does not change. At this time, all three signals C1, C1' and T1 are at a logic 1 level. This establishes a low resistance path between point F and point C2 and therefore point F will shift to the logic level present at C2. The logic level at point F then changes from a logic 1 to a logic 0 because there is a logic 0 present at point C2.

Since memory device 121 is basically the same as memory device 120, when F goes to a 0, G goes to a 1 and C2' goes to a 0. The logic level at point J does not change at this time for the same reason that the logic level at point E in memory device 120 did not change when T1 went from a 0 to a 1 and T2 was at a logic 0 state. Consequently, the logic level at point C2 remains unchanged.

The next timing signal change is T1 going from a 1 to a 0 and T2 going from a 0 to a 1. Point A and, therefore, points B and C' are unaffected by this change, as previously explained. The change of state of T2 from a 0 to 1 causes MOSFET switch 304 to close and point E will shift to a logic level present at point C1'. Therefore E will change states from a 0 to 1; consequently C1 will change states from a 1 to a 0. Point F will be unaffected by the change in states of T1 and T2. Therefore, point G and point C2' also remain unchanged. Upon closure of MOSFET switch 316, with T2 going from a 0 to a 1, point J will shift to the logic level present at point H and therefore the logic level point J will go from a 1 to a 0. Since the logic level at point C2 is the inversion of the logic level of point J, C2 will go from a 0 to a 1 when J goes from a 1 to a 0.

The next input signal change of state occurs when T2 goes from a 1 to a 0. As before, this does not change the logic level of any point but merely disconnects points C1' and E, A and C1' H and J, and F and H. Upon an exchange of state, from a 0 to a 1, point A will again change states. Therefore, A will go from a 1 to a 0, B from a 0 to a 1 and C1' from 1 to 0. This change of T1 from a 0 to 1 does not affect the logic level of point E and therefore of point C1. Point F is also unchanged since C1 and C1' are both at a logic 0 level and therefore MOSFET gates 307 and 308 are open. Since the logic level at point F in unchanged, the logic level of point G and the logic level of point C2' also remains unchanged. The logic levels of points J and C2 also remain unchanged at this time. When T1 and T2 next change states, T1 to a 0 and T2 to a 1, points A, B, and C1' are unaffected. Point E, however, adopts the logic level which was present at point C1' and therefore changes from a 1 to a 0. The logic level at point C1 consequently changes from a 0 to a 1. Point F remains unchanged since C1' is at a logic 0. Therefore, points G and C2' remain unchanged. Upon closure of MOSFET 316, point J adopts the logic level present at point C2' which then is a logic 0. Therefore since point J is already at a logic 0, it remains unchanged as does point C2. The next change of state of T2 from a 1 to a 0 effects the aforementioned disconnections but does not change the logic level of any point in FIG. 7. The following change of state of T1 from a 0 to a 1 causes the logic level at point A to change from a 0 to a 1 and consequently, B changes from a 1 to a 0 and C1' from a 0 to a 1. Points E and C1 remain unchanged at this time. Since C1', C1 and T1 are all at a logic 1, MOSFETS 307, 308, and 309 are all closed and point F will shift to the logic level present at point C2. Therefore, the logic level of point F will change from a 0 to a 1. Consequently, G will change from a 1 to a 0 and C2' will change from a 0 to a 1. The change of T1 from a 0 to a 1 does not cause a change at either point J or point C2. When T1 and T2 next change states, T1 to 0 and T2 to a 1, point A and therefore points B and C1' remain unchanged. At that time, however, MOSFET switch 304 is closed and point E shifts to the logic level present at point C1'. Therefore, point E changes from a 0 to a 1, consequently point C1 changes from a 1 to a 0. Point F remains unchanged since C1 is in a logic 0 level and therefore MOSFET switch 307 is open. Consequently point G and point C2' remain unchanged. T2 going from a 0 to a 1 closes MOSFET switch 316 and establishes a low resistance path between points J and C2'. Therefore, the logic level at point J will shift the logic level present at point C2'. The logic level at point J will change from a 0 to a 1 and consequently the logic level of point C2 will change from a 1 to a 0.

From the foregoing analysis, and the waveshapes of FIG. 8, the counter function of memory devices 120, through 132 can be appreciated. After one T1 pulse, the logic level at point C1 goes from a 0 to a 1 and the logic level at point C2 is 0. Following the passing of the second T1 pulse, the logic level at point C1 goes from 1 to 0 and the logic level at point C2 goes from a 0 to a 1. The third T1 pulse causes C1 to go from a 0 to a 1 and C2 to remain at a 1. The fourth pulse causes C1 to go to 0 and C2 to go to a 0, and also causes the logic levels of all the points designated in FIG. 7 to return to their initial logic state. Projecting these waveshapes, it is seen that each memory device 120 to 132 acts to give output signals of one half the frequency of the signals received as inputs. In the illustrated embodiment the signal generator of FIG. 3 is arranged to provide thirteen different timing signals, the period of any one of which is a whole number multiple of the basic signal C1. As was previously noted and now shown in FIG. 8, the two outputs of any one memory device in FIG. 6 are not complimentary in that if one output is at a logic 1 level, the other output is not necessarily at a logic 0 level. The two output signals are related in that they are equal in duration, opposite in direction, but phase displaced in time.

Figure 9:
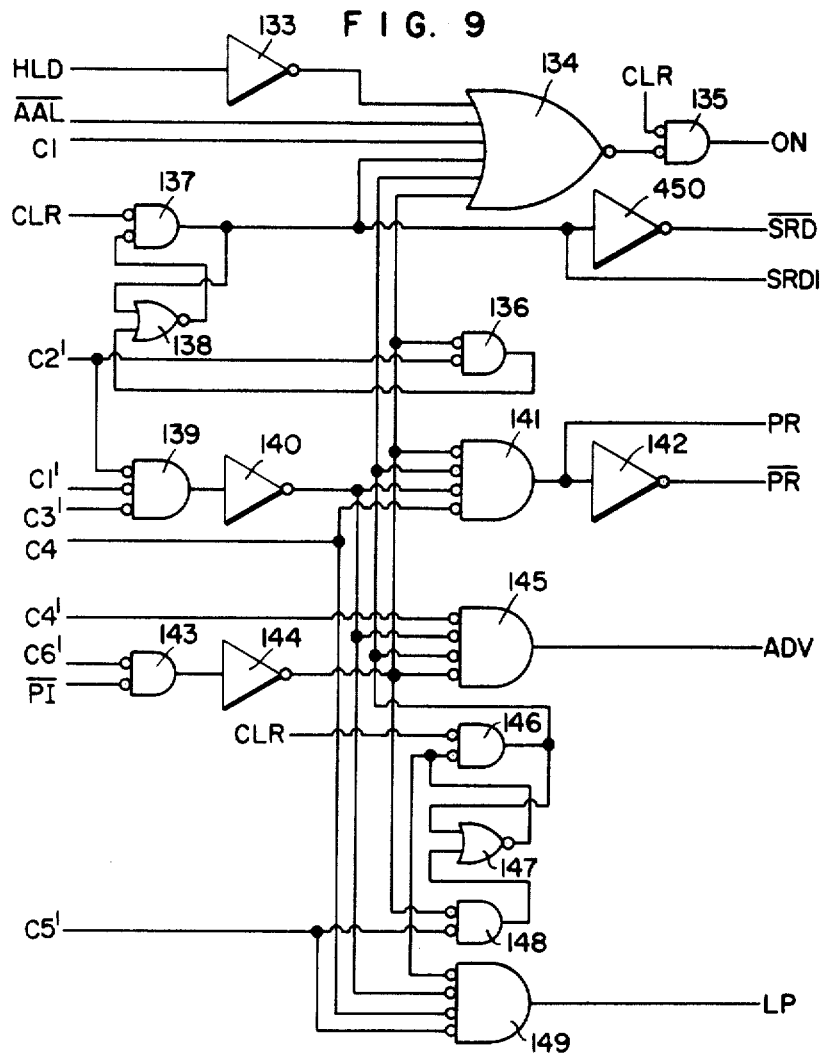
FIG. 9 is the logic circuit of the encoder shown in FIG. 3.

The Encoder as shown in FIG. 3 is illustrated in the logic diagram of FIG. 9. Input signal HLD goes through an inverter 133 and then to one input of a six input NOR gate 134. The output signal of NOR gate 134 and the signal CLR, go through a NOR gate 135. The output of which is the output signal ON. Inputs $\overline{AAL}$ and C1 are two other inputs of NOR gate 134. NOR gates 137 and 138 are interconnected in a manner wherein the output of each acts as one input of the other. The input signal CLR is one input of NOR gate 137 with the other input being the output of NOR gate 138. The output of NOR gate 137 is one input of NOR gate 138. The output of gate 137 is also connected to one input of NOR gate 134. The output of gate 137 also produces the $\overline{SRD}$ and SRD1 outputs of the Encoder. The other input of the NOR gate 138 is connected to the output of a NOR gate 136. One input of the two input NOR gate 136 is the input signal C2', the other input is the output of an inverter 144.

The output of inverter 144 is also connected to one input of the six input NOR gate 134. Input signal C2', C1' and C3' are the inputs to gate 139. The output of gate 139 goes through inverter 140 and is connected to one input of four input NOR gate 141. The output of NOR gate 141 is the Encoder output signal PR which also goes through inverter 142 to produce Encoder output signal $\overline{PR}$. The other inputs of the four input NOR gate 141, are input signals C4, the output of two-input NOR gate 146, and the output of inverter 144. The input signal C4' is connected to one input of the four input NOR gate 145. The output of gate 145 is the Encoder output signal ADV. Other inputs of gate 145 are the output of inverter 140, the output of gate 146, and the output of inverter 144. The inputs of the two-input NOR gate 143 are the input signals C6' and $\overline{PI}$. The output of gate 143 goes to inverter 144. Input signal C5' is connected to one input of the four input NOR gate 149. The output of the four input gate 149 is the encoder output LP. The other inputs to gate 149 are the output of gate 147, the output of inverter 140, and input signal C4. The inputs to NOR gate 148 are input signal C5' and the output of inverter 144. The output of gate 148 is connected to one input of two-input NOR gate 147. The output of gate 147 is connected to an input to gate 146. The other input to gate 146 is the encoder input signal CLR. The output of gate 146 is connected to one input of NOR gate 147. As previously discussed, the symbolic representation of the NOR gates used for the logic circuits of the examplary embodiment of the present invention is such to facilitate the formulation of the logic equations which prescribe the presence or absence of any logic signal. The encoder therefore, through the logic circuits shown in FIG. 9 encode the timing signals received from the Timing Signal Generator into output signals which either directly activate mechanisms, or further condition other signals present in the digital controller 40 to perform some function required by the recording instrument.

Figure 10:
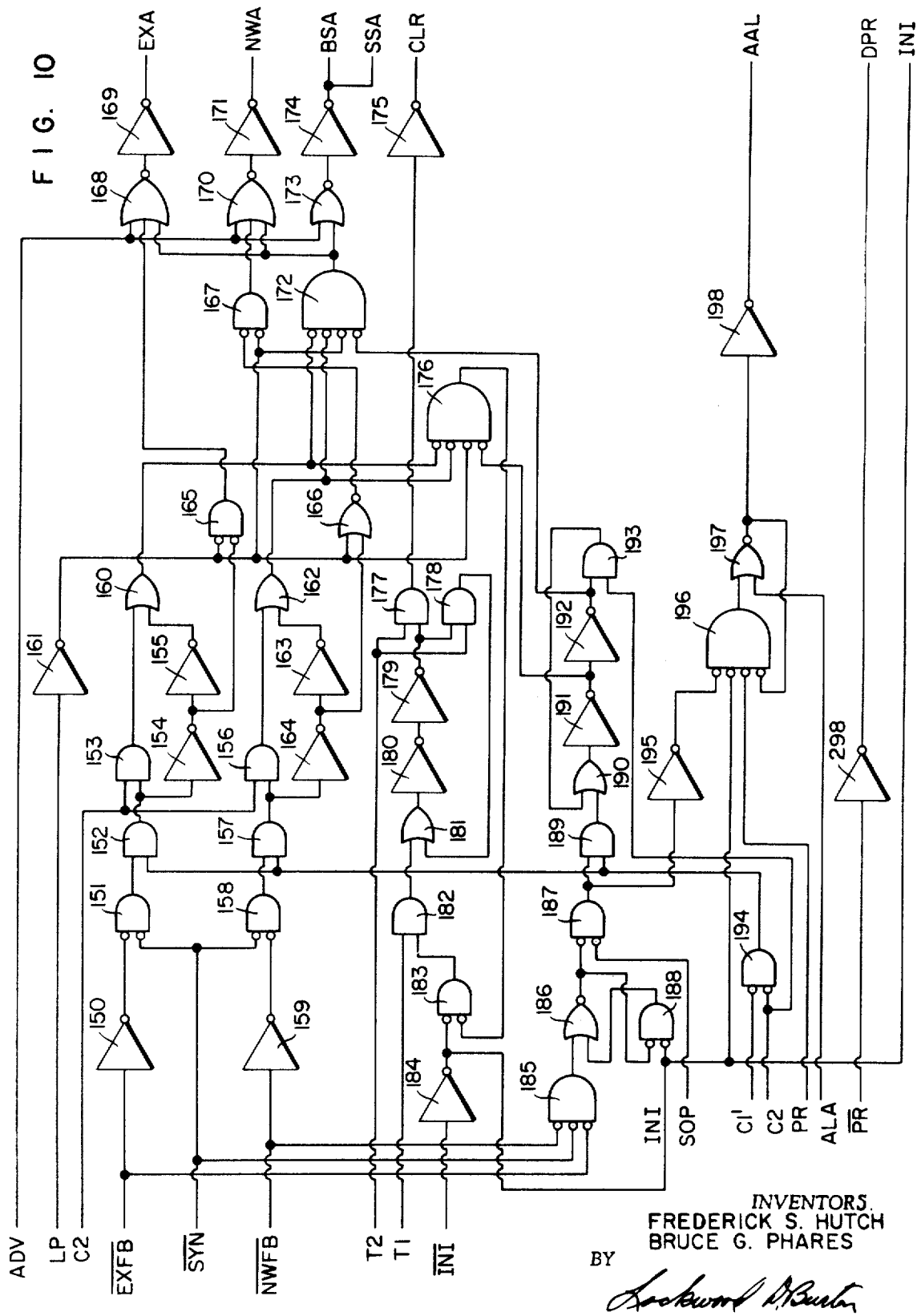
FIG. 10 is the logic circuit of the sequencer shown in FIG. 3.

The Sequensor of FIG. 3 is shown in greater detail of logic components in FIG. 10. Input signal $\overline{EXFB}$ is an input to inverter 150. The output of inverter 150 is an input to a two-input NOR gate 151. The other input to gate 151 is input signal $\overline{SYN}$. The output terminal of gate 151 is connected to AND gate 152. The other input to gate 152 is the output of the two-input NOR gate 194. The output terminal of gate 152 is connected to one input terminal of gate 153. The other input terminal of gate 153 is connected to receive input signal C2. The output terminal of gate 153 is connected to one input of a two-input OR gate 160. The other input terminal of the gate 160 is connected to the output terminal of inverter 155. The output of gate 160 is connected to one input of a four input NOR gate 176. The other inputs to gate 176 are the output terminal of gate 162, the output terminal of inverter 161, and the output terminal of inverter 191. The input to inverter 161 is connected to input terminal LP. The output of gate 176 is connected to one input of a two-input NOR gate 183. The other input of gate 183 is connected to the output terminal of inverter 184. The input to inverter 184 is connected to the input terminal $\overline{INI}$. The output of gate 183 is one input of AND gate 182. The other input to gate 182 is input signal T1. The output of AND gate 182 is connected to one input of a two-input OR gate 181. The other input to gate 181 is the output of AND gate 178. The output of gate 181 is connected to the input of inverter 180, the output of which, in turn, is connected to the input of inverter 179. The output of inverter 179 is connected to one input of AND gate 177, the other input of which is the input signal T2. The output of AND gate 177 is then connected to the input of inverter 175, the output of which is the output signal CLR. Input signal NWFB goes through inverter 159 and to one input of a two-input NOR gate 158. The other input of the gate 158 is input signal $\overline{SYN}$. The output of gate 158 is connected to one input of two-input AND gate 157 the other input of which is connected to the output of NOR gate 194. The output of AND gate 157 is connected to one input of gate 156, the other input of which is connected to input signal C2.

The output of gate 152 is connected through inverter 154 to one input of the two-input NOR gate 165. The other input of this NOR gate is connected to the output terminal of inverter 161. The output signal of inverter 154 is also connected through another inverter 155 to one input of two-input OR gate 160. To one input of three input NOR gate 168 is connected the output terminal of the NOR gate 165. The other inputs to gate 168 comprise the input signal ADV and the output of gate 172. The output of gate 168 is connected through an inverter 169 to the output terminal EXA. The output of gate 157 is connected through an inverter 164 to an input of two-input NOR gate 166. The other input of this gate is connected to the output of inverter 161. The output of the NOR gate 166 is connected to one input of a two-input NOR gate 167. The other input to gate 167 is connected to the output of inverter 161. The output of gate 167 is connected to one input of three-input NOR gate 170. The other inputs to the NOR gate 170 are input signal ADV and the output of the gate 172. The output of gate 170 is connected through inverter 171 to the output terminal NWA. The output of inverter 164 is also connected through inverter 163 to one input of a two-input NOR gate 162. The four-input NOR gate 172 has as inputs the output of OR gate 160, the output of OR gate 162, the output of inverter 161, and the output of inverter 192. The output of the NOR gate 172 is connected to one input terminal of a two-input NOR gate 173. The other input of the gate 173 is connected to the input terminal ADV. The output of gate 173 is connected through inverter 174 to the output terminals BSA and SSA.

The output of the inverter 179 is one input of AND gate 178. The other input of gate 178 is input terminal T2. The output terminal of 178 is connected to one input terminal of OR gate 181. Input signals $\overline{EXFB}$, $\overline{SYN}$ and $\overline{NWFB}$ are all connected to a three-input NOR gate 185. The output of gate 185 is connected to one input of two-input NOR gate 186. The other input of gate 186 is connected to the output terminal of gate 188. The output terminal of gate 186 is connected to one input of the two-input NOR gate 188. The other input of gate 188 is connected to the output of inverter 184. The output of gate 186 is also connected to one input of two-input NOR gate 187. The other input of gate 187 is connected to the Sequencer input terminal SOP. The output terminal of gate 187 is connected to one input of two input AND gates 189. The other input to gate 189 is connected to the output of the NOR gate 194. Gate 189 has its output connected to one input of OR gate 190. The other input to gate 190 is connected to the output of gate 193. The output of gate 190 is connected to the input of inverter 191. The inputs to the tow-input AND gates 193 are the outputs of inverter 192 and the input signal C2. The output of gate 187 is connected through inverter 195 to one input terminal of four-input NOR gate 196. The other inputs to gate 196 are the output of inverter 184, input signal PR, and the output of NOR gate 197. The output of gate 196 is connected to one input terminal of two-input NOR gate 197. The other input to gate 197 is connected to the input terminal ALA. The output terminal of gate 197 is also connected through inverter 198 to output terminal AAL. Input terminal C1' and C2 are connected to the two-input NOR gate 194. Input terminal C2 is also connected to one input of two input OR gate 193. Input terminal $\overline{PR}$ is connected through inverter 298 to output terminal DPR. By means of the logic circuits presented in FIG. 10, the sequensor of FIG. 3 receives input signals, which are then conditioned and correlated with various other input signals, and produces several output signals which are properly spaced in time and sequence. The resulting output signals are used to direct a desired systematic functioning of the examplary embodiment of the present invention.

Figure 11:
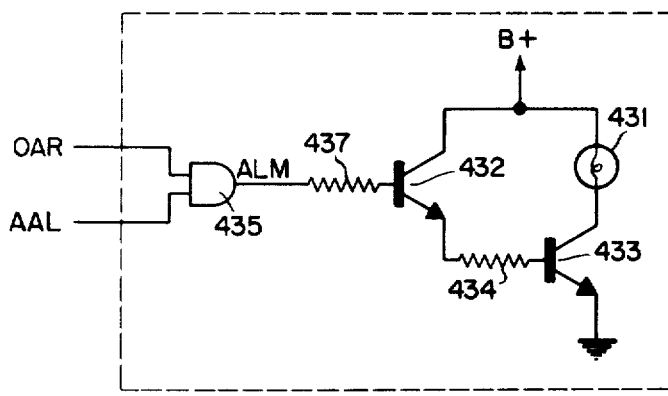
FIG. 11 is a schematic diagram of the Alarm Detector shown in FIG. 1.

FIG. 11 shows the circuit comprising the alarm detector 90 indicated in FIG. 1. The two-input AND gate 435 has inputs of the arm alarm (AAL) signal and the "Outside Acceptable Range" (OAR) signal. Its output terminals connected through a resistor 437 to the base terminal of a transistor 432. The emitter terminal transistor 432 is connected through a resistor 434 to the base terminals of another transistor 433. The emitter terminal of the transistor 433 is connected to ground and its collector terminal is connected to one side of a light source 431. The other side of this light source 431 is connected to a common point connecting the collector terminal of the first transistor 432 and a supply voltage B+. The output terminal of the AND gate 435 is designated as ALM. The input signal AAL provides a time slot during which the other input signal OAR may be detected. The arm alarm AAL signal will go to a logic 1 periodically. The period of time which elapses between the time that the input channel selector switch arrives at a new point and the time AAL goes to a logic 1, is predetermined so that when AAL goes to a logic 1, the servo system has had sufficient time to balance on the value of the signal present at the new point. As hereinbefore mentioned, in connection with FIG. 1, switching means 436 is operable to select either a logic 1 or a logic 0. Since switching means 436 is controlled by the servo motor 17, the alarm limits may be defined so that switching means 436 will be connected to a voltage representative of a logic 1 condition when the input signal sensed at the input channel is either below a low alarm limit or above a high alarm limit. For either of these conditions, the logic level present at the "Outside Alarm Range" OAR terminal of the alarm detector 90 will be a 1. And conversely, if the signal present at the input channel is within the preselected acceptable range, then a logic 0 will be present at the "Outside Acceptable Range" OAR terminal, thereby indicating this situation (outside acceptable range) is false (in the "logic" sense). After the input signal selector switch has arrived at a new point, the sequensor, in conjunction with the alarm timing signal generator (FIG. 3), insures that the servo system has sufficient time to balance on the new point before allowing the arm alarm signal AAL to go to a logic 1. When AAL goes to a logic 1, AND gate 435 will effectively interrogate its other input signal OAR to determine whether an alarm condition is present. Assuming an alarm condition is present, input terminal OAR is at a logic 1 level and an alarm signal ALM will be generated. In the examplary embodiment of the present invention this signal will energize a light source 431. In addition to utilizing the alarm signal ALM for indicating an alarm condition, this signal may also be used as a control signal to effect other alarm control functions in the instrument.

FIG. 12 shows in more detail the circuits comprising the Skip Numeral Circuit as shown in FIG. 3. There bistable memory devices FF1-FF7 are shown. Each memory device has inputs of T2,T3 and RESET. In addition to these, the last six memory devices receive two of their inputs from the outputs of the preceeding memory device. The two outputs of the memory device FF1 are indicated as F1 and F1'. The remaining memory devices have outputs designated in a similar manner. The F6 output of memory element FF6 is connected to the gate terminal of MOSFET 200 and the FF7 output of memory element FF7 is connected to the gate terminal of MOSFET 201. The drain terminal of MOSFET 200 is connected to the logic 0 bus and the drain terminal of MOSFET 201 is connected to the source terminal of MOSFET 200. The source terminal of MOSFET 201 is connected through a resistor to the logic 1 bus, and also to the source terminal of MOSFET 202. The gate terminal of MOSFET 202 is connected to the input terminal T3 and its drain terminal is connected to a common point connecting the gate terminal of MOSFET 203 and the source terminal of MOSFET 204. The gate terminal of MOSFET 204 is connected to the input terminal T2, its drain terminal is connected to a common point connecting the gate terminal of MOSFET 207 and the source terminal of MOSFET 206. The drain terminal of MOSFET 203 is connected to the logic 0 bus, its source terminal is connected through a resistor 209 to the logic 1 bus and also to a common point connecting the gate terminal of MOSFET 205 and the Reset line. The Reset line connects to one input terminal of each memory element FF1 through FF7. The drain terminal of MOSFET 205 is connected to the drain terminal of MOSFET 206 and both terminals are connected to the logic 0 bus. The source terminals of MOSFET's 205 and 206 are also connected together and through a resistor to the logic 1 bus and also to a common point connecting the gate terminal of MOSFET 207 and the drain terminal of MOSFET 204. Input signal INI is connected to the gate terminal of MOSFET 206. Input signal $\overline{PR}$ is connected to the gate terminal of MOSFET switch 208. The drain terminals of MOSFET 207 and MOSFET 208 are connected together and to a logic 0 bus. The source terminals of MOSFETs 207 and 208 are also connected together and, through a resistor, to the logic 1 bus. The source terminal of MOSFET 208 is designated as NPR1 and is connected to one input of two-input NOR gate 217. The other input of the NOR gate 217 is connected to the output of the three-input NOR gate 216. One input of gate 218 is connected to the output of gate 215. The output of gate 218 is connected to the output terminal NPR.

The inputs to three-input NOR gate 216 are input terminal SKN3, input terminal SKN2, and input terminal $\overline{PR}$. The input terminals to two-input NOR gate 215 are input terminal SKN3, and the output terminal of the inverter 214. The input to inverter 214 is connected to the input terminal SKN2. Input terminal SKN1 is connected to the input terminal of inverter 212, the output of which is connected to the second bistable memory device FF2. Two-input NOR gate 213 has inputs of SKN1 and SKN2. The output of gate 213 is connected to one input of the bistable memory device F3.

The bistable devices FF1 to FF7 are connected in a manner similar to that shown in FIG. 7 and together they function generally as a counter. When the output of gate 212 is at a logic 1, this logic 1 signal effectively short-circuits the F1 and F1' inputs of the bistable memory device FF2. In this instance, the counter will be a six element device with FF2 being the first element having a decimal value of "1" and FF7 being the last element having a decimal value of "32." Every time the outputs FF6 and FF7 become a logic 1 the counter will have counted 48 T3 pulses. The next arriving T3 pulse will represent the 49th pulse to be counted. When the output of gate 213 is at a logic 1 level the F2 and F2' inputs to the bistable memory device FF3 are effectively short-circuited and the counter acts as a five element counter. FF3 will now represent the decimal "1" and FF7 will represent the decimal value "16." Now when the outputs FF6 and FF7 are both 1 the counter will have counted 24 pulses. The next arriving T3 pulse will represent the 25th pulse to be counted. When both the output of gate 212 and the output of gate 213 are at a logic 0 level the counter is a seven element device with output terminal FF1 having a decimal value of "1" and output terminal FF7 having a decimal value of "64." Now when the outputs FF6 and FF7 are both at a logic 1 level, the counter will have counted 96 pulses. The next T3 pulse will represent the 97th pulse to be counted. When the outputs FF6 and FF7 are both at a logic 1 level, MOSFET switches 200 and 201 are in the state of conduction and thereby establish a logic 0 at the source terminal of MOSFET 202. Upon the next arriving T3 signal going to a logic 1 state, MOSFET switch 202 closes and presents a logic 0 to the gate terminal of MOSFET switch 203. Thereupon, MOSFET switch 203 is opened and a logic 1 is presented through resistor 209 to the reset line connected to the source terminal of MOSFET switch 203. A logic 1 on the reset line acts to reset the counter which will then begin again to count T3 pulses after the reset signal returns to a logic 0 state. Reset returns to a 0 after FF6 and FF7 have been reset and their outputs are at a logic 0 level, MOSFET switches 200 and 201 are open, and MOSFET switch 202 brings a logic 1 into the input gate of MOSFET switch 203. This signal closes MOSFET switch 203 and brings a logic 0 to the reset line, thereby enabling the counter.

The counter will also be reset whenever INI goes to a 1 which occurs when the recorder is initially turned on. A logic 1 at INI closes MOSFET switch 206 and brings a 0 to one terminal of MOSFET switch 204. Thereafter when T2 is at a 1, MOSFET switch 204 closes thereby presenting the logic 0 to the gate input of MOSFET switch 203. Since this opens MOSFET switch 203 and logic 1 will be applied to the reset terminal, When FF6 and FF7 have been reset, output signals FF6 and FF7 are 0 and the logic 1 at the input gate of MOSFET switch 202 will close the switch and bring the logic 1 to the input gate of MOSFET switch 203. MOSFET switch 203 will thereupon close and the reset signal will go to a logic 0 and remain there until either FF6 and FF7 go to a logic 1, or another INI signal is presented.

Figure 22:
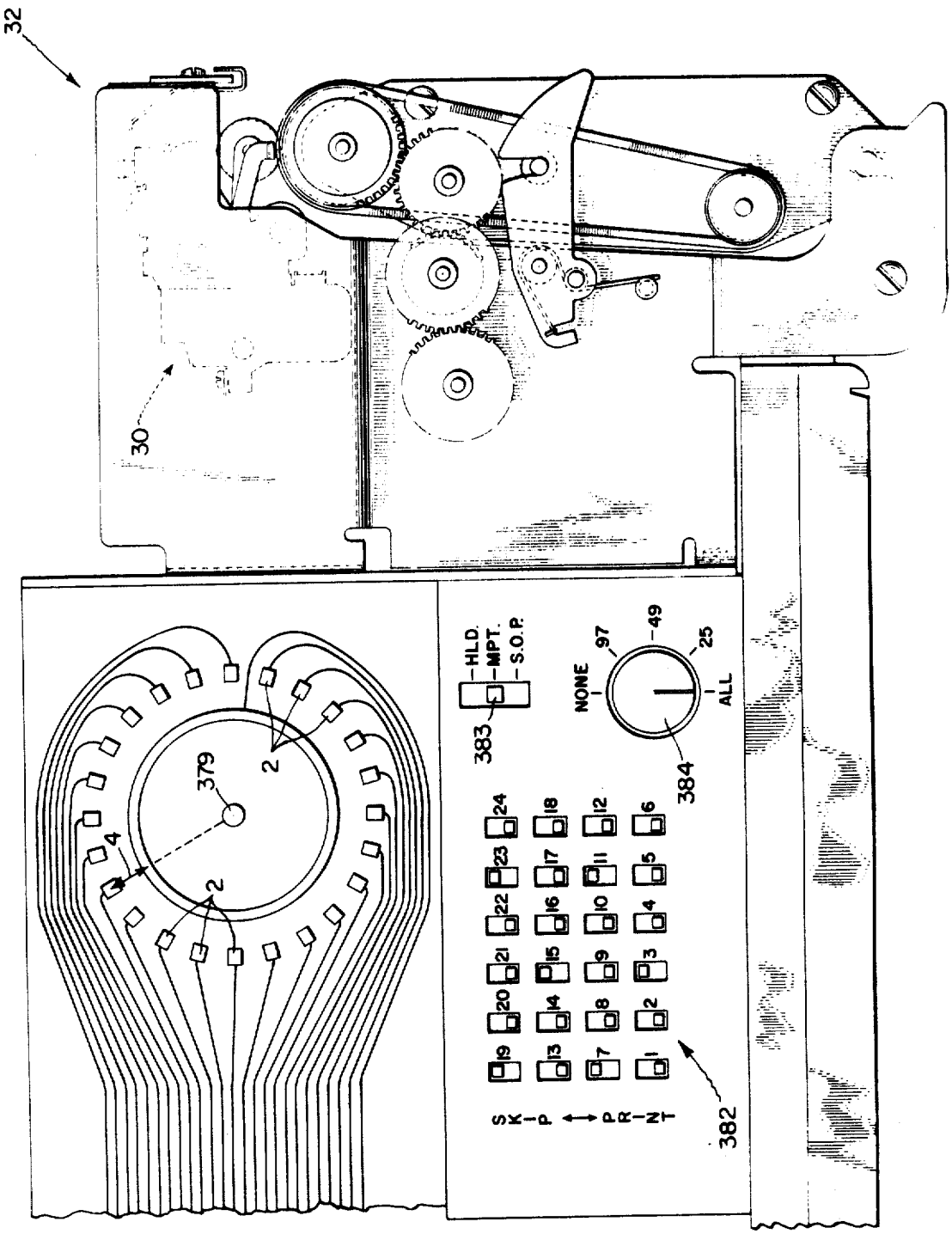
FIG. 22 is a fragmentary side view of the recording instrument according to the present invention.

Through a selector switch 384, which is shown in FIG. 22, the ratio of identifying numeral print marks (NPR) to selector switche advances (SSA) may be predetermined. Through the gating of the skip numeral circuit as shown in FIG. 12, a code is prescribed which directs the frequency of printing of numeral identifying marks NPR with respect to selector switch advances SSA. If signals SKN1, SKN2 and SKN3 are all set at logic 0, one numeral identifying mark will be printed for every selector switch advance. If a logic 0 is present at terminals SKN1 and SKN2 and the logic 1 is present at terminal SKN3 then the numeral print ratio will be 1/25, i.e. one numeral print mark occurring on every 25th advance of the selector switch. If a logic 1 is present at the SKN2 and SKN3 terminals and a logic 0 is present at the SKN1 terminal, the numeral print ratio is 1/49. If a logic 1 is present at all three input terminals, the numeral print ratio is 1/97. And, finally, if a logic 1 is present at input terminals SKN1 and SKN2 and a logic 0 is present at terminal SKN3, no numeral identifying marks will be printed. Selector switch 384 (FIG. 22) accomplishes the coded application of the proper logic levels to input terminals SKN1, SKN2 and SKN3 which, in turn, direct the operation of the skip numeral circuit. For example, if SKN1 is 0 and SKN2 is 0 and SKN3 is 1, there will be a logic 1 output of gate 213. This logic 1 signal causes the counter to act as a five element device with FF7 having a decimal value of 16 and FF6 having a decimal value of 8. Therefore, when both FF6 and FF7 outputs are in a logic 1 level, the counter has counted up to 24. Upon the next arriving T3 signal, the logic 0 will be presented to the gate input terminal of MOSFET 203. Since the signal opens MOSFET switch 203, a logic 1 will appear at the input gate of MOSFET switch 205. This, in turn, will produce a logic 0 at the gate input terminal of MOSFET switch 207. MOSFET switch 207 will then be opened; a logic 1 will appear at the source terminal of MOSFET switch 207. Therefore, the signal NPR1 goes to a logic 1 upon the arrival of every 25th pulse of signal T3. A numeral print pulse NPR will only be produced when both the output signal of gate 215 and the output signal of gate 217 are at the logic 0 level. Since SKN3 is at a logic 1 in this example, the output of gate 216 is at a logic 0 and the output of gate 217 will be a logic 0 only when input signal NPR1 goes to a logic 1. With SKN2 being a 0 the output of inverter 214 is at a logic 1 and the output of gate 215 is at a logic 0. When input terminal SKN1 and SKN2 are at a logic 0 level and the input terminal SKN3 is at a logic 1 level a numeral print pulse will be generated on every 25th T3 signal. As indicated in FIG. 4, T3 will go to a logic 1 with every selector switch advance pulse SSA. Therefore, with the specified inputs at terminals SKN1, SKN2 and SKN3, one numeral print pulse NPR will be generated on every 25th selector switch advance SSA pulse.

If the selector switch 384 in FIG. 22 is set at the point labelled "none," the inputs SKN1 and SKN2 will be a logic 1 level and the input SKN3 will be in a logic 0 level. If input SKN2 is in the logic 1 level the output of inverter 214 will be at a logic 0 level. Since SKN3 is also at a logic 0 level the output of gate 215 will be the logic 1 level. But with SKN3 at logic 0, the output of gate 217 cannot go to logic 1, therefore, the NPT output of gate 218 will never go to logic 1 and therefore no numeral print signals will be generated while the selector switch 384 is in the "NONE" position.

Figure 13:
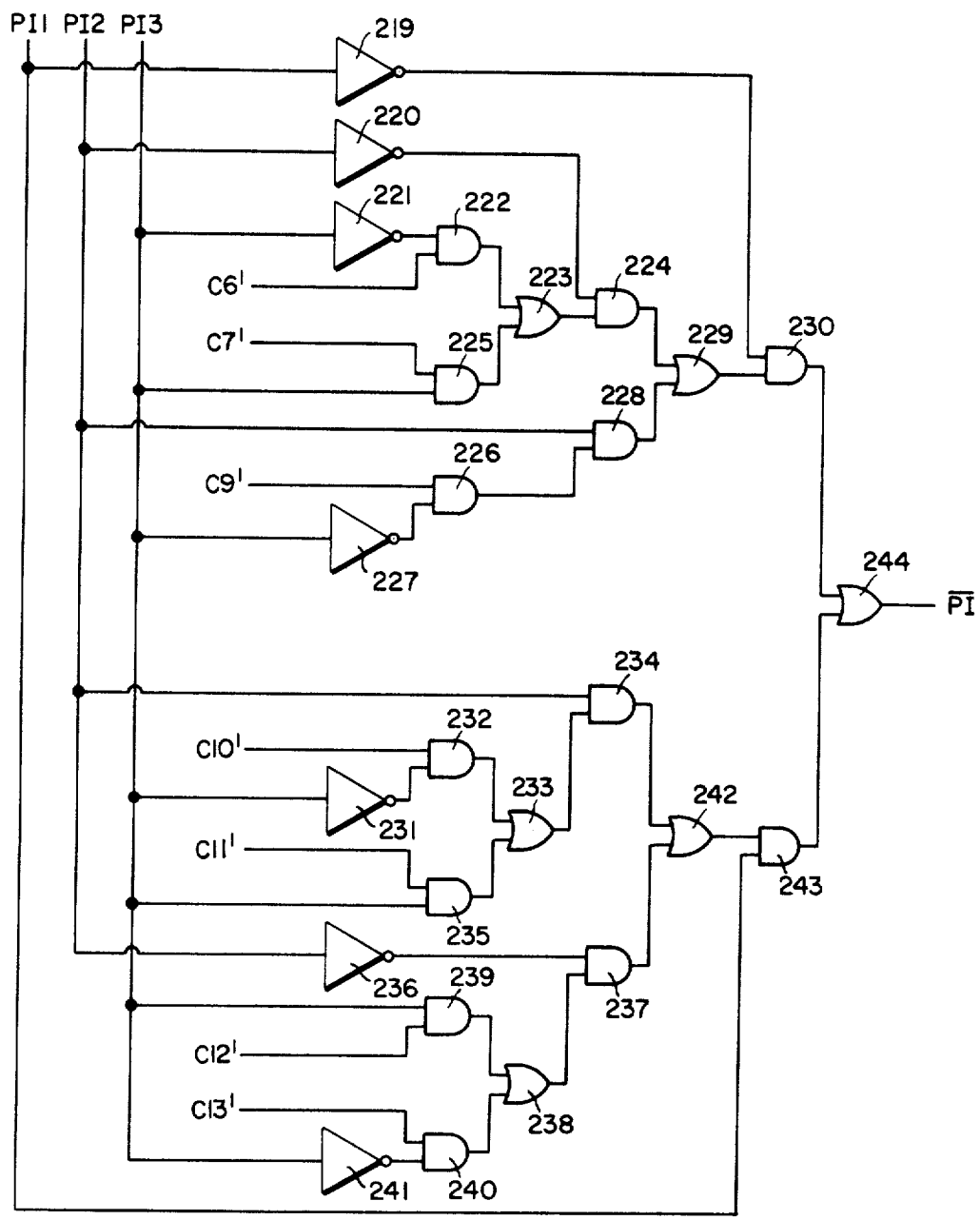
FIG. 13 is a logic diagram of the Print Interval Gating Circuit shown in FIG. 3.

The print interval gating circuit of FIG. 3 is shown in its logic components in FIG. 13. Input terminal PI1 is connected to the input terminal of an inverter 219. The output of inverter 219 is connected to one input of a two-input AND gate 230. The other input of gate 230 is connected to the output of two-input OR gate 229. One input of gate 229 is connected to the output of two-input AND gate 224. The other input of gate 229 is connected to the output of two-input AND gate 228. Input signal PI2 goes through an inverter 220 and is connected to one input of gate 224. The other input of gate 224 is the output of the two-input OR gate 223. One input of gate 223 is connected to the output of two-input AND gate 225. Gate 225 has inputs of C7' and PI3. The other input of the two-input OR gate 223 is connected to the output of the two-input AND gate 222. Gate 222 has inputs of C6' and the output of inverter 221. PI3 is connected to the input of inverter 221. Input signal PI3 is also connected to the input of inverter 227 the output of which is connected to one input of the two-input AND gate 226. The other input of AND gate 226 is C9' and the output of gate 226 is connected to one input of the two-input AND gate 228. The other input of gate 228 is connected to the input terminal PI2. The output of two-input AND gate 230 is connected to one input of two-input OR gate 244. The other input to gate 244 is the output of gate 243. One input of two-input AND gate 243 is connected to the input signal PI1; the other input is connected to the output of the two-input OR gate 242. The inputs of gate 242 are the output of gate 234 and the output of gate 237. One input of the two-input AND gate 234 is connected to the input signal PI2, and the other input is connected to the output of the two-input OR gate 233. The inputs to the two-input OR gate 243 are connected to the output of gate 232 and the output of gate 235. Input signal PI3 is connected to inverter 231, the output of which is connected to one input of the two-input AND Gate 232. The other input of gate 232 is the input signal C10'. Input signal PI13 and input signal C11' are connected to the inputs of the two input AND gate 235. Input signal PI2 is connected to the input of inverter 236, the output of which is connected to one input of the two-input AND gate 237. The other input to gate 237 is connected to the output of the two-input OR gate 238. The outputs of gate 239 and 240 are connected to the inputs of gate 238. Gate 239 has inputs of PI3 and C12'. PI3 is also connected to inverter 241. The output of inverter 241 is connected to one input of gate 240. The other input to gate 240 is the input signal C13'. The output of the two-input OR gate 244 is designated as output $\overline{PI}$.

Through the logic circuitry of FIG. 13 any one of seven different Print Cycle Times may be selected by means of the individual selector switches 301, 302 and 303 shown in FIG. 2. A Print Cycle Time is defined as the period of time between successive Selector Switch Advance Pulses going to a logic level in the normal multipoint MPT mode of operation.

The Alarm Timing Signal Generator shown in FIG. 3 is shown in its logic components in FIG. 14. Input signal SRD1 is connected to one input of a three-input NOR gate 254. The other two inputs to gate 254 are connected to the output of inverter 253 and input terminal C6. The input of inverter 253 is connected to the output of the three-input OR gate 252. The inputs of OR gate 252 are connected to the output of AND gate 241, the output of AND gate 248 and the output of AND gate 250.

The inputs of the two-input AND gate 251 are the output of two-input AND gate 246 and the output of inverter 249. The input of inverter 249 is connected to the input terminal AL2. The inputs of AND gate 246 are connected to input terminal AL1 and the output of NOR gate 245. Gate 245 has inputs of C4' and C5'. Input signal AL1 is connected to the input of inverter 247 the output of which is connected to one input of gate 248. The other input of gate 248 is the input C7. AND gate 250 has input signals of AL1 and C9. The output of NOR gate 254 is designated as ALA. Signal ALA is then connected to the sequensor shown in FIGS. 3 and 10 which further conditions the signal ALA and provides an Arm Alarm AAL signal. The different combinations of logic levels present on alarm timing signal generator inputs AL1 and AL2 direct variations in the length of time elapsing between the time the input channel selector switch arrives at a new point and the time signal ALA goes through a logic 1 level. ALA going to a logic 1 conditionally causes the arm alarm signal AAL to also go to a logic 1 level. As hereinbefore explained in connection with FIG. 11 the time during which the arm alarm signal AAL is at a logic 1 level defines that time during which a test is made by the alarm detector 90 (FIG. 1) to determine whether or not the signal present at the input channel is within a predetermined acceptable range. Before this test is made, the servo system must be allowed sufficient time to balance on the new input channel signal value being sensed. If the test is made before the servo system has been allowed sufficient time to balance on the value of the signal present at the new point, the test will be premature and consequently inaccurate. The time required by the servo system to balance on a new point is determined by the preselected acceptable range for each particular recorder application. By means of the alarm timing signal generator and the Arm Alarm portion of the sequensor, the period of time between the time that the selector switch arrives at a new point, and the time that a test is made for an alarm condition may be varied in order to correspond to the length of time required by the servo system to balance on the value of the signal presented by a new point.

Figure 15:
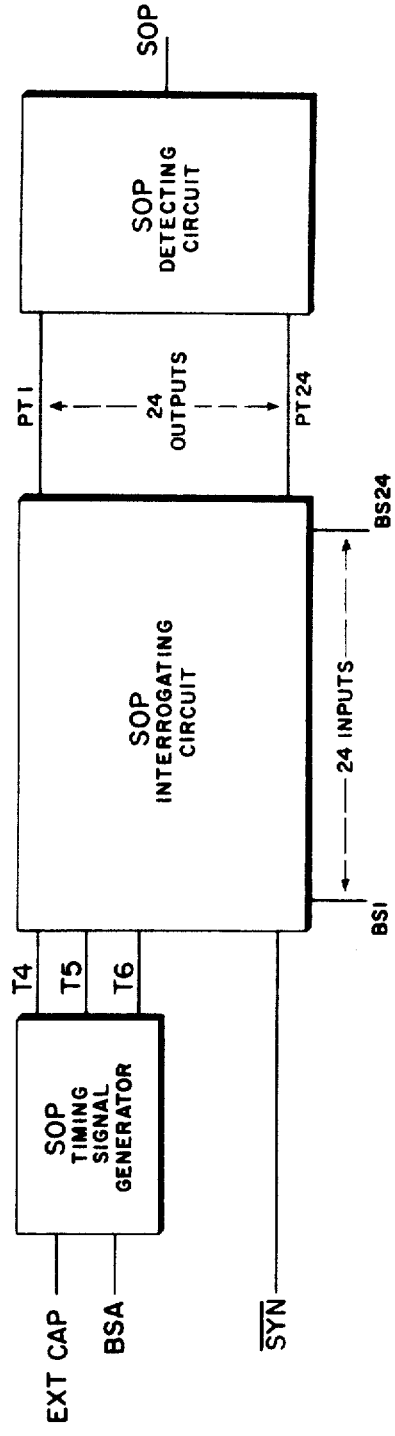
FIG. 15 is a block diagram of "Chip B" shown in FIG. 2.

In FIG. 15, there is shown a block diagram of the components which comprise chip B as indicated in FIG. 2. Chip B comprises an SOP Timing Signal Generator, an SOP Interrogating Circuit, and an SOP Detecting Circuit. The inputs to the SOP Timing Signal Generator are EXT CAP and BSA. The three outputs of the SOP Timing Signal Generator are connected to inputs of the SOP Interrogating Circuit. These are disignated as T4, T5 and T6. Input signal $\overline{SYN}$ provides another input to the SOP Interrogating Circuit. The SOP switching means 382, shown in FIG. 2 and FIG.22, provides 24 additional input signals, BS1 through BS24, to the SOP Interrogating Circuit. The SOP Interrogating Circuit has 24 output terminals, PT1–PT24, which are connected directly to input terminals of the SOP Detecting Circuit. The output of the SOP Detecting Circuit is designated as SOP.

FIG. 16 is a schematic diagram of the SOP Timing Signal Generator of FIG. 15. Input signal BSA is connected to the gate input terminal of MOSFET switch 255. The drain of MOSFET 255 is connected to the logic 0 bus and its source is connected through a resistor 210 to the logic 1 bus. The source terminal of MOSFET 255 is connected to a common point A which connects the gate terminal of MOSFET 257 and the gate terminal of MOSFET 258. The drain terminal of MOSFET 257 and the drain terminal of MOSFET 258 are both connected to the logic 0 bus. The source terminal of MOSFET switch 257 is connected to the drain terminal of MOSFET switch 256. The gate terminal of MOSFET switch 256 is connected to the source terminal of switch 258. The source terminal of MOSFET switch 258 is also connected to the logic 1 bus through a resistor, and to the gate terminal of MOSFET switch 261. The source terminal of MOSFET 256 is connected to the logic 1 bus. The point of common connection C between the drain terminal of MOSFET 256 and the source terminal of MOSFET 257 is connected to the input gate of MOSFET switch 259. The input EXT CAP is also connected to this point. The drain terminal of MOSFET 259 is connected to a logic 0 bus; its source terminal is connected to a common point D, thence through a resistor to the logic 1 bus. The common point D is also connected to the gate terminal of MOSFET 260. The drain terminals of MOSFET switches 260 and 261 are connected together and to the logic 0 bus; their source terminals are also connected together to a common point E, and then through a resistor, to the logic 1 bus. The common point E is also connected to the gate terminal of MOSFET switch 262. The common point E is also connected to the gate terminals of MOSFET switches 267 and 268. The drain terminal of MOSFET switch 262 is connected to the logic 0 bus; its source terminal is connected to a common point F to the gate terminal of MOSFET switch 265 and also through a resistor to the logic 1 bus. The built in capacitance 264 is connected between the gate terminal of MOSFET switch 265 and the logic 0 bus. MOSFET 265 has its drain terminal connected to the logic 0 bus and its source terminal connected through a resistor to the logic 1 bus and also to the gate terminal of MOSFET 266. An output terminal T4 is also connected to the gate terminal of MOSFET 266. The drain terminals of MOSFET 266 and MOSFET 267 are connected together and to a logic 0 bus. MOSFETS 266 and 267 have their source terminals connected together and through a resistor to a logic 1 bus and also to the source terminal of MOSFET 269. Output terminal T5 is also connected to the source terminal of MOSFET 269. The gate terminal of MOSFET 267 is connected to the gate terminal of MOSFET switch 268. The drain terminal of MOSFET 268 is connected to the logic 0 bus; its source terminal is connected to the drain terminal of MOSFET 269. An output terminal T6 is also connected to the drain terminal of MOSFET 269. A built-in capacitance 210 is connected between the drain terminal of MOSFET 269 and the logic 0 bus.

Figure 17A:
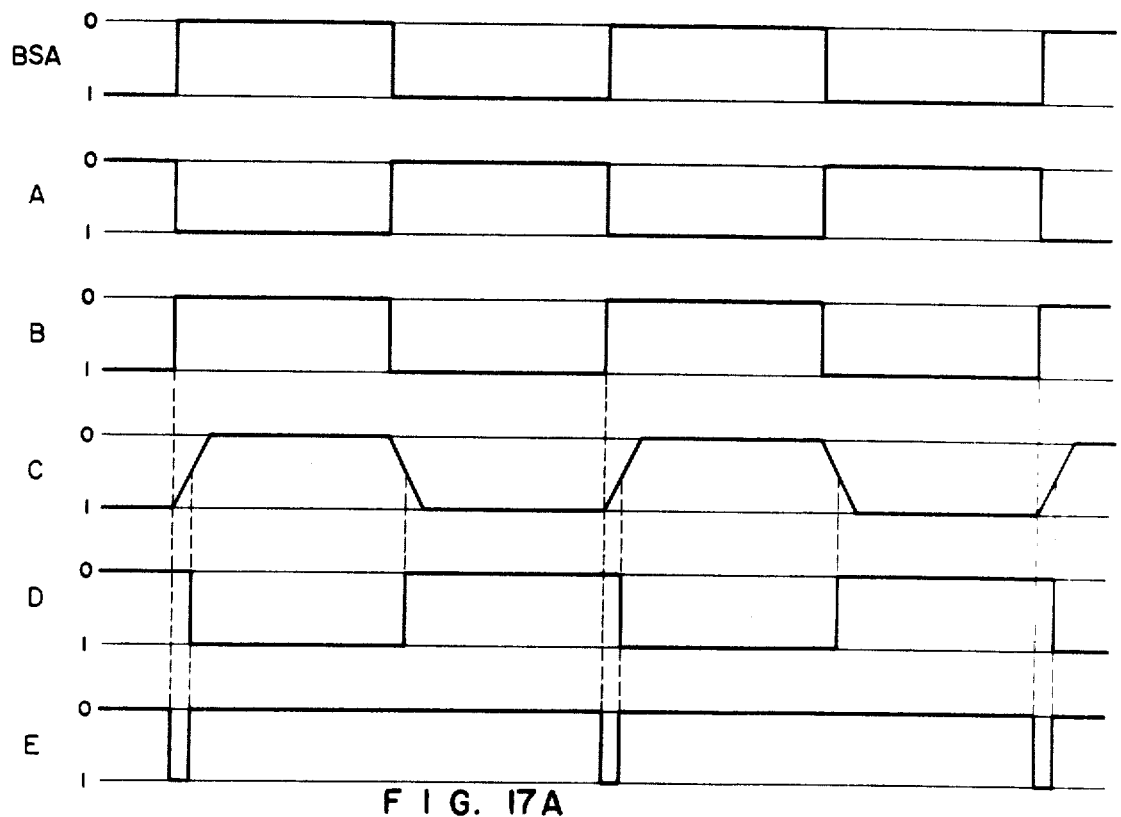
FIG. 17A and FIG. 17B are waveform diagrams showing the changes in logic levels occurring at different points of the schematic diagram shown in FIG. 16.
Figure 17B:
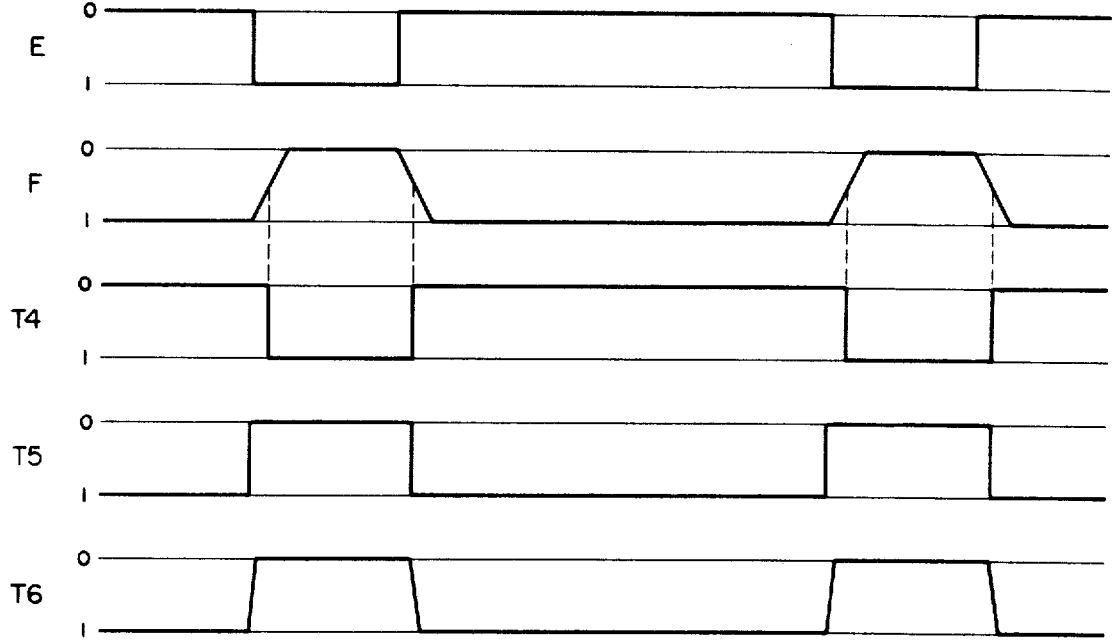

In FIG. 17A and 17B, the waveshapes of the different signals appearing at the various points indicated in FIG. 15 are shown. Input signal BSA and signals A, B, C, D and E are shown in FIG. 17A. The waveshapes appearing at points E, F, T4, T5 and T6 are shown in FIG. 17B. When input BSA is at a logic 1 level MOSFET switch 255 is closed and point A is at a logic 0 level. Since point A is at a logic 0 level, MOSFET switch 258 is open and point B is at a logic 1 level. With point B at the logic 1 level, MOSFET switch 256 is closed thereby allowing the logic 1 to be present at point C. Necessarily, when point B is at a logic 1, point A is at a logic 0. Therefore, since the logic levels present at points A and B are always opposite, either MOSFET switch 256 will be closed and MOSFET switch 257 will be open or MOSFET switch 257 will be closed and MOSFET switch 256 will be open, but they will never both be open or closed at the same time. When point C is at a logic 1, MOSFET switch 259 is closed and point D is at a logic 0. With point D at a logic 0, MOSFET switch 260 is open, but MOSFET switch 261 is closed since point B is at logic 1. Therefore, point E will be a logic 0 initially. When E is at a logic 0, MOSFET switch 262 is open and point F will be at a logic 1. Point C4 will therefore be at a logic 0 since the logic level 1 present at point F causes MOSFET switch 265 to be closed. Since point T4 is at a logic 0 and point E is also at a logic 0, both MOSFET switch 266 and MOSFET switch 267 will be open and a logic 1 will be present at T5. Since the gate of MOSFET switch 269 is connected to a logic 1 at all times, a logic level present at T6 will be the same as that present at T5 except as hereinafter described, and therefore T6 will be a logic 1 initially. The purpose of MOSFET switch 269 is to act as a small resistance which serves in conjunction with the built-in capacitance 210, to slightly delay the change of states at point T6 with respect to the change of logic states at point T5. This feature is later required for the proper functioning of the SOP Interrogating Circuit which is described at a latter point in the specification. When input signal BSA goes to a logic 0, MOSFET switch 255 is turned "off" and point A will change states and go to a logic 1. Consequently, MOSFET switch 258 is turned "on" and point B will go to a logic 0. The external capacitance introduced at point C acts to oppose a sudden change of logic states at that point. Therefore, when A goes to a 1 and B goes to a 0, the logic level at C will begin to change states from a 1 to a 0 but will not reach the 0 level until a predetermined time delay after the logic levels at points A and B have arrived at their new logic states. Therefore, when B goes to a 0, C will gradually change from a 1 to a 0. At a predetermined level during this gradual change from a 1 to a 0, MOSFET switch 259 will be turned "off" and at that instant, point D will go from a 0 to a 1. The only time that point E will be at a logic 1 level, is when both MOSFET switch 260 and MOSFET switch 261 are open. This only occurs when the signal at point D and the signal at point B are concurrently at a logic level of 0. Point D is initially at a logic level of 0 and point B is initially at a logic level of 1. Point B however, changes states before point D changes states since the change at point D is indirectly delayed by the introduction of the external capacitance at point C. Therefore, when B goes to a 0, the logic level at point E will go to a 1, but shortly thereafter when the logic level at point D goes to a 1, the logic level at point E will return to a 0 and remain there until the next time B goes from a 1 to a 0 while D is at a logic 0. When input signal BSA returns to a logic 1, MOSFET switch 255 will close and point A will go to a logic 0. When A goes to a logic 0 MOSFET switch 258 is turned "off" and B goes to a logic 1. on Since point B is at a logic 1 level, MOSFET switch 256 is closed and the logic level at point C will gradually return to a logic 1 level. This gradual change is caused by the presence of the external capacitance connected to point C as hereinbefore explained. At a predetermined time during the gradual change from the logic 0 to a logic 1 of point C, MOSFET switch 259 will close and point D will switch to a logic 0. Since at this time point B is already at a logic 1, MOSFET switch 261 is closed and point E will remain at a logic 0. At this time the signals BSA, A, B, C, D and E are all at their initial logic levels, and will henceforth behave in the manner previously described in accordance with the input signal BSA. The signal appearing at point E is redrawn on an expanded scale in FIG. 17B. The built-in capacitance 264 will not allow the logic level at point F to change states immediately with the opening and closing of MOSFET switch 262, but will introduce a time delay which will effect a gradual change at point F as directed by MOSFET switch 262. Therefore, when E goes from a zero to a one MOSFET switch 262 closes and point F will gradually change from a logic 1 to a logic 0. At a predetermined point during this gradual change from a one to a zero, MOSFET switch 265 will be turned "off" which will then cause T4 to go from a zero to a one. T5 will be at a logic 0 when either MOSFET switch 266 or MOSFET switch 267 is closed. MOSFET switch 266 is closed when T4 is at a logic 1 and MOSFET switch 267 is closed when E is at a logic 1. Therefore, when E goes to a logic 1, T5 will go to a logic 0. The subsequent change of T4 from a 0 to a 1 will not affect T5 since T5 is already at a logic 0. As previously explained, the combination of the built-in capacitor 210 and MOSFET switch 269 introduces a short time delay so that T6 will not immediately follow T5 but will be delayed briefly and therefore T6 will reach the logic 0 level a short time after T5 switches to the logic 0 level. The values of the intrinsic capacitance 210 and the resistance introduced by MOSFET 269 produce a more rapid logic level change at point T6 than is produced at point F. When E goes from a 1 to a 0, F will gradually change from a 0 to a 1. At the triggering point during this change, T4 will change from a 1 to a 0. When T4 goes to a logic 0, and since E is already at a logic 0, point T5 will change from a logic 0 to a logic 1. This occurs because both MOSFET switch 266 and MOSFET switch 267 are open thereby disconnecting point T5 from the logic 0 bus. Due to the built-in capacitance 210, the change from a 0 to a 1 of T5 will produce a gradual change from a 0 to a 1 at T6. Then signals F, T4, T5 and T6 switch 425 and their initial logic levels and will again change states, as previously described, in accordance with the change of states occurring at point E.

Figure 18:
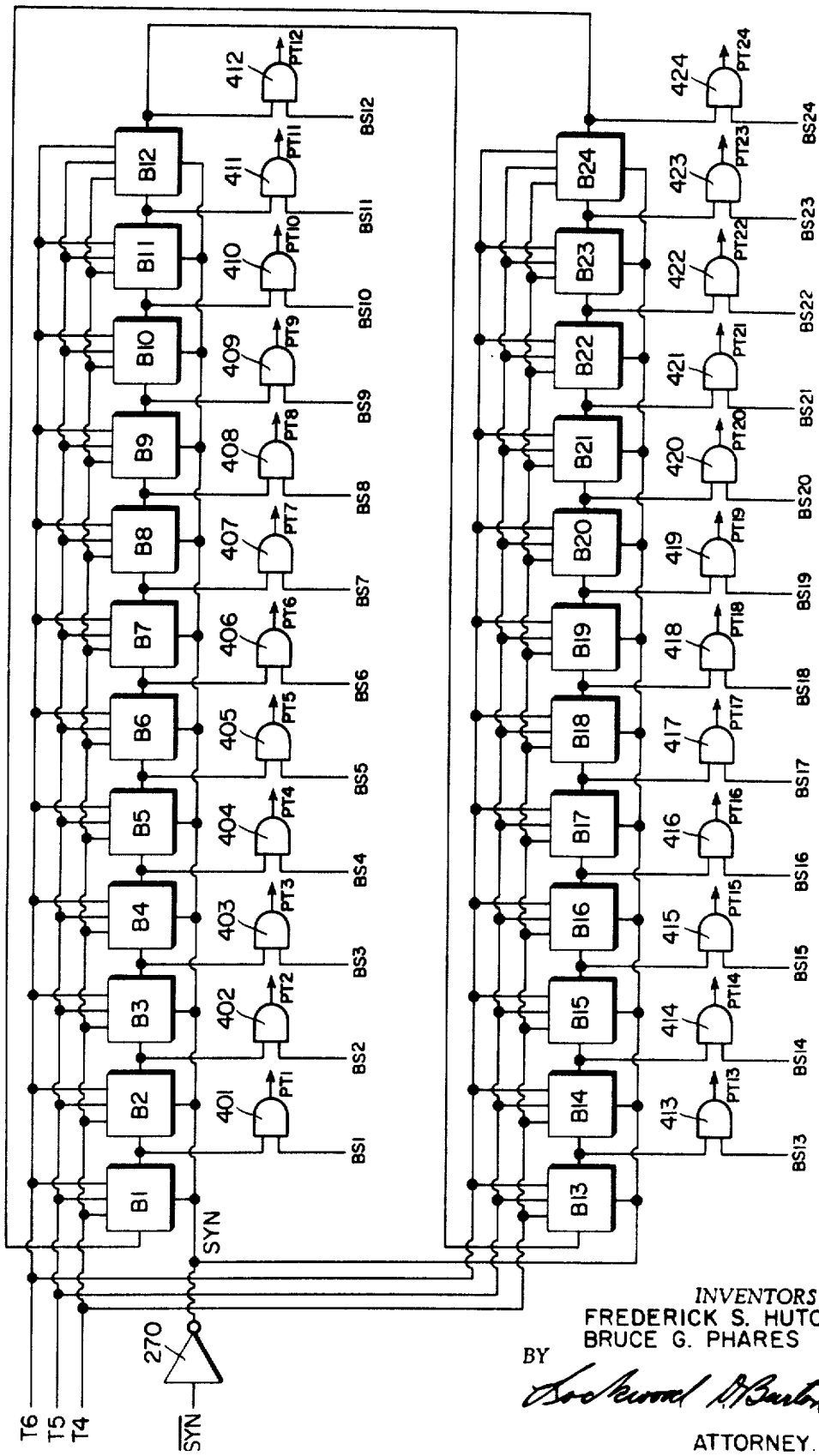
FIG. 18 is a logic diagram of the SOP Interrogating Circuit shown in FIG. 15.

FIG. 18 shows the content of the SOP interrogating circuit of FIG. 15. The SOP interrogating circuit comprises 24 memory devices designated B1 to B24, and 24 AND gates 401 to 424. Each memory device B1 to B24 has inputs of T4, T5 and T6. Input signal $\overline{SYN}$ goes through an inverter 270 and is connected to one input of each memory th B1 to B24. The output of each memory device B1 to B24 is directly connected to the input of the next succeeding memory device. The output of memory B24 is connected to the input of memory B1. For each memory device, B1 to B24, there is a corresponding AND gate 401 to 424. The output of each memory element in addition to being connected to the next element, is connected to one input of its corresponding two-input AND gate 401 to 424. The other input to each AND gate is connected to an output terminal BS1 to BS24 which is, in turn, connected to a switching means 382 shown in FIG. 2 and FIG. 22. The output of each AND gate 401 to 423 is connected to an input terminal of the SOP Interrogating Circuit PT1 to PT23.

Figure 19:
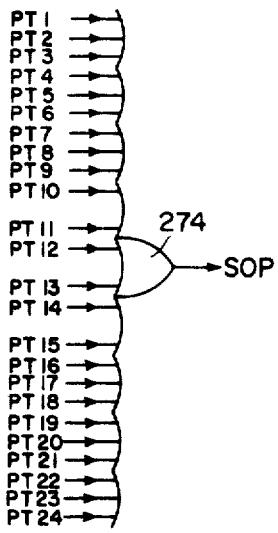
FIG. 19 is a logic diagram of the SOP Detecting Circuit shown in FIG. 15.

The SOP Detecting Circuit indicated in block form in FIG. 15 is presented in logic diagram form in FIG. 19 as a 24 input OR gate 274. The 24 inputs comprise PT1 to PT24 which are the outputs of the SOP Interrogating Circuit. The output of OR gate 274 is connected to an output terminal SOP.

When the $\overline{SYN}$ input signal of FIG. 18 goes to a 0, the output signal of the inverter 270 goes to a logic 1, and all of the memory elements B1 to B24 except the first one, B1, will be reset and therefore a logic 0 will appear at their respective output terminals. The $\overline{SYN}$ input going to 0 causes the first memory elements B1 to be set and a logic 1 appears at its output. The internal circuitry of the memory elements B1 to B24 is such that the individual memory devices output signal initially present at the output of the first memory element B1, will be propagated one memory element for every occurrence of a Selector Switch Advance signal received by chip B (B-SA). Therefore, initially, the output of the first memory device B1 is at a logic 1 level, and the outputs of the remaining memory devices B2 to B24 are at a logic 0 level. Upon receipt of the next BSA pulse, as translated into the three timing signals T4, T5 and T6, the second memory element B2 will change states and its output will go to a logic 1 level. At this time all of the remaining memory elements B1 and B3 to B24, are at a logic 0 level. Upon receipt of the third Selector Switch Advance pulse received by chip B, BSA, the third memory element B3 in the SOP interrogating circuit will go to a logic 1 and the outputs of the remaining memory elements will be at a logic 0. As hereinbefore explained, the output of each memory element is connected to one input of a two-input AND gate, there being one AND gate 401 to 424 for each memory element B1 to B24. The other input to each respective AND gate is connected to one of the 24 output terminals BS1 to BS24 with each output terminal BS1 to BS24, in turn, being connected to one of the 24, two-position switches S1 to S24 of switching means 382 shown in FIG. 2 and in FIG. 22. Each two-position switch S1 to S24 represents one input channel. Therefore each input channel is sequentially interrogated to test for the logic level present thereon. For example, after the occurrence of input signal $\overline{SYN}$ going to a logic zero, input channel 1 is tested. If then, switch S1 is connected to a logic 1 level, a logic 1 is presented to input terminal BS1 of FIG. 18. Therefore since both inputs of AND gate 401 are at a logic 1 level, there will be a logic 1 present at its output PT1. The 24 input OR gate 274 shown in FIG. 19 will detect or sense the presence of a logic 1 at any of the output terminals PT1 to PT24, of the 24 AND gates 401 to 424. Whenever a logic 1 is detected at any one of these points PT1 to PT24, a logic one will appear at the SOP output terminal of OR gate 274. The logic level presented at the output terminal SOP, will therefore direct the sequencer to either skip or print the information present at the input channel then being sensed. When SOP is at a logic 0 level the channel being sensed will be skipped and the selector switch will advance to the next input channel. If the SOP signal then goes to a logic 1 level, indicia representative of the information present at that input channel will be printed provided other conditions, to be hereinafter discussed are satified.

The first three memory elements B1, B2 and B3 of FIG. 18 are shown schematically in FIG. 20. Input terminal T4 is connected to the gate terminal of MOSFET 275. The source terminal of MOSFET 275 is connected to input signal B24 which is the output terminal of the memory element B24. The drain terminal of MOSFET 275 is connected to a common point A connecting the gate terminal of MOSFET 277 and the source terminal of MOSFET 425. Between this point A and the logic 0 bus there is also present a built-in capacitance 276. Input terminal T6 is connected to the gate terminal of MOSFET 425. Its drain terminal is connected to the source terminal of MOSFET 281 at a common point B1. The drain terminal of MOSFET 277 is connected to the logic 0 bus; its source terminal is connected through a resistor to the logic bus and also, at a common point D, to the source terminal of MOSFET 278. The gate terminal of MOSFET 278 is connected to the T5 input terminal; its drain terminal is connected to a common point C connecting the source terminal of MOSFET 280 and the gate terminal of MOSFET 281. Between this point and the logic 0 bus there is also present a built-in capacitance 279. The gate terminal of MOSFET 280 is connected to the SYN line which is in turn connected to the output of the invertor 270 (FIG. 18). MOSFET 280 has its drain terminal connected to the logic 0 bus; its source terminal is connected to the gate terminal of MOSFET 281 at the common point C. The drain terminal of MOSFET 281 is connected to the logic 0 bus; its source terminal is connected through a resistor to the logic 1 bus and also to the common point B1 connecting the drain terminal of MOSFET 425 and the source terminal of MOSFET 282. T4 is connected to the gate terminal of MOSFET 282, its drain terminal is connected to a common point E connecting the gate terminal of MOSFET 284 and the source terminal of MOSFET 285. Also present between this point E and the logic 0 bus is the built-in capacitance 283. The gate terminal of MOSFET 285 is connected to input terminal T6; its drain terminal is connected to the common point of connection B2 of the source terminals of MOSFET 288 and MOSFET 289. MOSFET 284 has its drain terminal connected to the logic 0 bus and its source terminal connected through a resistor to the logic 1 bus and, at a common point F, also to the source terminal of MOSFET 286. The gate terminal of MOSFET 286 is connected to input terminal T5 and its drain terminal is connected at a common point G to the gate terminal of MOSFET 288. A built-in capacitance 287 is also shown connected between this point G and the logic 0 bus. The drain terminals of MOSFET 288 and MOSFET 289 are connected together and to the logic zero bus. Their source terminals are connected together and through a resistor to the logic 1 bus and also to a common point B2 connecting the drain terminal of MOSFET 285 and the source terminal of MOSFET 290. The gate terminal of MOSFET 289 is connected to the SYN line. The gate terminal of MOSFET 290 is connected to input terminal T4; and its drain terminal is connected to a common point I connecting the gate terminal of MOSFET 292 to the source terminal of MOSFET 294. Also present between this point I and a logic 0 bus is an intrinsic or built-in capacitance 291. The gate terminal of MOSFET 294 is connected to input terminal T6; its drain terminal is connected to the point of common connection B3 of the source terminals of MOSFET 296 and MOSFET 297. MOSFET 292 has its drain terminal connected to the logic 0 bus; its source terminal is connected at a common point through a resistor to the logic 1 bus and also to the source terminal of MOSFET 292. T5 is connected to the gate terminal of 293 and its drain terminal is connected to the gate terminal of MOSFET 296 at a common point K. Intrinsic capacitance 295 is connected between the gate terminal of MOSFET 296 and the logic 0 bus. MOSFET 296 and MOSFET 297 have their drain terminals connected together and to the logic 0 bus and their source terminals connected together at the common point B3 and through a resistance to the logic 1 bus.

FIG. 21 shows the waveshapes of the logic signals appearing at the different points called out in FIG. 20. The timing signals T4, T5 and T6 have been previously developed in connection with FIG. 15 and are redrawn in FIG. 21. The starting point for all the waveshapes shown is that instant of time immediately after the occurrence of the SYN signal going to a logic 1 level. The SYN signal will cause MOSFET switch 280 to "close" and a logic 0 will appear at point C. This logic 0 "opens" MOSFET switch 281 and the path of least resistance at point B1 then will be through a relatively small resistance 426 to the logic 1 bus. Therefore logic 1 will be present at point B1. Since T6 is at a logic 1 level, MOSFET switch 425 is "closed" and the logic 1 present at point B1 is fed back to point A. With a logic level of 1 present at point A, MOSFET switch 277 is "closed" and the path of least resistance presented to point D is through the closed MOSFET switch 277 to the logic 0 bus. Therefore, logic 0 will be present at point D.

The SYN signal going from a 0 to a 1 closes MOSFET switch 289 of the second memory device B2. This introduces a logic zero at point B2. Since T6 is at a logic 1, MOSFET switch 285 is closed and the logic 0 present at B2 will be fed back and appear at point E. Since point E is at a logic 0, MOSFET switch 284 is "open" and point F will be at a logic 1 level. At that time, T5 will be at a logic 1 level and MOSFET switch 286 will be "closed;" therefore the logic level at point G will be the same as the logic level at point F, i.e. a logic 1.

When SYN goes to a 1, MOSFET switch 297 of memory element B3 "closes" and presents a logic 0 to point B3. Since at that time T6 will be at a logic 1 level, MOSFET switch 294 will be "closed" and a logic 0 is fed back to the gate terminal of MOSFET 292. This logic 0 causes MOSFET switch 292 to be in a non-conducting state and therefore logic 1 will be present at point J at that time. With T5 at a logic 1, MOSFET switch 293 will be "closed" and point K will also be at a logic 1 level. The first change of state of input signals occurs when T5 goes from a 1 to a 0. In the first memory device, B1 this change of state causes MOSFET switch 278 to "open," thereby disconnecting point D from point C. Because of the built-in capacitance 279, the logic level at point C will remain unchanged. This built-in capacitor 279 will store the charge representative of the logic level present at point C before MOSFET switch 278 opened.

Capacitor 279 will discharge very slowly since the only path of discharge available to point C are through MOSFET switch 280 and MOSFET switch 278, both of which are open thereby presenting relatively high resistance discharge paths. Therefore none of the points indicated in memory device B1 will change states when C5 goes from a 1 to a 0. In memory devices B2 and B3, this logic level change of T5 opens MOSFET switches 286 and 293, respectively. The respective capacitances 287 and 295 of memory devices B2 and B3 will retain the charge present at points G and K respectively before MOSFET switch 286 and MOSFET switch 293 had opened. Therefore it is seen that throughout all three memory devices B1, B2 and B3, there will be no logic level change at any of the points indicated therein when T5 goes from a 1 to a 0.

The next input signal change of logic level state occurs when T6 reaches a logic 0 level. That change of state causes MOSFET switch 425 to open and thereby disconnect point A from point B1. Built in capacitance 276 will retain the logic level present at point A before MOSFET switch 425 opened since the only paths of discharge available to point A are through MOSFET switch 425 and MOSFET switch 275, both of which are open. Since MOSFET switch 275 and MOSFET switch 425 are open at this time they present relatively high resistance discharge paths to point A and therefore the built-in capacitance 276 will discharge very slowly. Since no immediate logic level change appears at point A and similarly, at points E and I of memory elements B1, B2 and B3, respectively, there will be no logic level change at any of the points designated in FIG. 21 when T6 reaches a logic 0 level.

The next input signal change of state occurs when T4 goes from a 0 to a 1. At that time MOSFET switch 275 will close and the logic level present at B24 will appear at point A. Therefore, since the SYN signal had previously reset memory element B24, a 0 will be present at input B24 and A will go to a logic 0 at that time. When A goes to a 0, MOSFET switch 277 opens and a logic 1 is presented at point D through a resistance 426. Therefore, point D will go from a 0 to a 1. Since T5 is still at a logic 0 level, MOSFET switch 278 is still open and the logic at point C will remain at the 0 level. Consequently, if C remains at the 0 level, MOSFET switch 281 will remain open and a logic 0 will be retained at point B1. Similarly, when T4 goes to a logic 1, MOSFET switch 282 of the second memory device B2 will close and the logic level present at point B1 will be presented to point E. Since prior to T4 going to a 1, B1 was at a logic 1 level and since B1 did not change, a logic 1 will be presented to point E. Therefore, point E will change from a 0 to a 1. When E changes from a 0 to a 1, MOSFET switch 284 closes and presents a logic 0 to point F. Therefore, point F will change from a 1 to a 0. Since at that time T5 will be still at a logic 0 level, and therefore MOSFET switch 286 will be still open, the logic level present at point G will not change at that time. Since the logic level at point G remains at the logic 1 level, MOSFET switch 288 is closed and point B2 remains at a logic 0 level.

T4 going to a logic 1 also closes MOSFET switch 290 of memory B3. Since point B2 had been at a logic 0 level, T4 going through a 1 causes a 0 to be presented to point I. Since I had already been at a logic 0 level, there will be no change at this point, therefore none of the logic levels indicated in the memory device B3 will change states.

The next change of state of input signals occurs when T4 goes from a 1 to a 0 and T5 goes from a 0 to a 1. When T4 goes from a 1 to a 0, MOSFET switch 275, MOSFET switch 282 and MOSFET switch 290 of memory elements B1, B2 and B3, respectively are all caused to be open thereby disconnecting the inputs of the elements but no logic level changes occur at this time, T5 goes to a logic 1 "closes" MOSFET switch 278, MOSFET switch 286 and MOSFET switch 293 thereby connecting point D and point C, point F and point G, and point J and point K, respectively. In memory element B1, the closure of MOSFET switch 278 will cause the logic level previously present at point D to appear at point C. Therefore, when T5 goes from a 0 to a 1, C will go from a 0 to a 1. When C goes to a 1, MOSFET switch 281 "closes" and a logic 0 appears at point B1. Since at that time, T6 will be at a logic 1, MOSFET switch 425 will be closed and point B1 will be connected to point A. Since A is then already at a logic 0 level, no change will occur at point A. T5 going from a 0 to a 1 closes MOSFET switch 286 of memory element B2 thereby connecting point F to point G. At that time, the logic level previously present at point F will appear at point G. Since F was at a logic 0, G will go from a 1 to a 0. This, in turn, opens MOSFET switch 288 and B2 will go from a 0 to a 1. Since T6 at that time will be at a logic 1 level, MOSFET switch 285 will be closed and there will be a connection between point E and point B2. Since E is then already at a logic 1, there will be no change in logic levels at point E and consequently, no change at point F. T5 going from a 0 to a 1 causes MOSFET switch 293 of memory element B3 to close thereby connecting point J and point K, therefore, the logic level present at point J will appear at point K. Since the logic level present at point J and point K was a 1 prior to the closure of switch 293, there will be no change at point K at this time. Since K remains at a logic 1, MOSFET switch 296 remains closed and a logic 0 will remain at point B3.

The next change of state of input signals occurs when T5 goes to a 0. That change disconnects point D from point C, point F from point G, and point J from point K, of memory devices B1, B2 and B3, respectively, but, as previously explained, causes no logic level change at any of the points indicated in FIG. 20.

The next input signal change of state occurs when T4 goes from a 0 to a 1. In memory element B1, that change closes MOSFET switch 275, thereby connecting point A and point B24. Since both point A and point B24 are in the logic 0 state at this time, no logic level change will occur at point A. Since no change occurs at point A, points D, C and B1 will also remain unchanged. T4 going to a 1 causes MOSFET switch 282 of memory device B2 to "close" thereby connecting the points B1 and E. Therefore the logic level present at point B1 will appear at point E, and E will go from a 1 to a 0 at that time. Since E goes to a 0, MOSFET switch 284 "opens" and F goes to a logic 1. Since at that time T5 is at a logic 0, MOSFET switch 286 is open and no change will occur at point G. Since G remains at a logic 0, MOSFET switch 288 remains open and B2 retains its logic 1 level. In memory device B3, when T4 goes to a logic 1, a path is established between point B2 and point I and therefore the logic level appearing at point B2 will be presented to point I. Since B2 has been at a logic 1, I will go from a 0 to a 1. When I goes to a logic 1, MOSFET switch 292 "closes" and a logic 0 will appear at point J. Since at that time, T5 will be at a logic 0, MOSFET switch 293 will be "open." While MOSFET switch 293 is "open," there will be no connection between point J and point K and therefore the logic level at point K will not change at that time. Since K remains at a 1, MOSFET switch 296 retains its state of conduction and B3 remains at a logic 0 level.

Input signals T4 and T5 next change states with T4 going to a logic 0 and T5 going to a logic 1. As previously explained, T4 going to a logic 0, opens MOSFET switches 275, 282 and 290 of memory elements B1, B2 and B3 respectively. This however, causes no change in logic levels. In memory element B1, when T5 goes to a 1, point C will adopt the logic level present at point D. Since at that time they are both at the logic 1 level, no change will occur. In memory element B2, T5 going to a 1 causes point G to shift to the logic level present at point F. Therefore, point G will go from a 0 to a 1. When G goes to a 1, MOSFET switch 288 "closes" and B2 will go from a 1 to a 0. T5 going to a 1 also causes MOSFET switch 293 to close thereby providing a low resistance path between point I and point K of memory element B3. Therefore, point K will go to a logic 0. Consequently, point B3 will go to a logic 1.

The next input signal change of state which precipitates a change in logic levels at any point in FIG. 20, occurs when T4 goes to a logic 1. At that time, since B24 is still at a logic 0, and A is at a logic 0, there will be no change of state at point A, and therefore no change of state at point in memory element B1. T4 going to a 1 connects point B1 and point E of the second memory element B2. Since B1 and E are both at a logic 0 level at this time, there will be no change of logic level at point E and therefore no change at any point of the second memory element B2. T4 going to a 1 causes MOSFET 290 of the third memory element B3 to close thereby connecting point I and point B2. Since B2 is at a 0, point I will change from a 1 to a 0. When point I goes to a 0, MOSFET switch 292 opens and the logic level at point J will go to a 1. Since at that time T5 is at a logic 0, MOSFET 293 is open and there will be no change in the logic level present at point K. Therefore, K will remain at a logic 0 and B3 will remain at a logic 1.

The next input signal change occurs when, simultaneously, T4 goes to a logic 0 and T5 goes to a logic 1. The change in T4 causes no logic level changes. In the first memory element B1, when T5 goes to a 1, MOSFET switch 278 will close and point C will adopt the logic level present at point D. Since the level at both of these points is a 1, there will be no change. In the second memory element, B2, when T5 goes to a 1, MOSFET switch 286 is closed and point G will adopt the logic level present at point F. Since both of these are at a logic 1, there will be no change. In the third memory element B3, when T5 goes to a 1, MOSFET switch 293 is closed thereby connecting point J and point K. At that time, point K will adopt the logic level present at point J. Since point J is a logic 1, point K will go from a 0 to a 1. When point K is the logic 1 level, MOSFET switch 296 is closed and point B3 will go to the logic 0 level.

Comparing the outputs of the three memory elements, B1, B2 and B3, it will be observed that immediately after an SYN signal going to a logic 1 state is introduced, the output of the first memory element B1 will be a logic 1 and the outputs from the other memory elements will be at a logic 0. Since the timing signals T4, T5 and T6 are caused by the BSA signal going to a logic 0 (FIG. 17), there will be a new set of timing pulses generated each time the selector switch stops at a new input channel. From FIG. 21 it can be seen that for each set of timing pulses, T4, T5 and T6 a logic 1 level will be shifted from the output of one memory element to the output of the next memory element. Thus, there will always be a logic 1 output from one of the 24 memory devices B1–B24. Therefore, each two position switch S1–S24 will be sequentially interrogated to determine the logic level present thereon.

A fragmentary side view of the recording instrument according to the present invention is shown in FIG. 22. A switching means 382 is indicated which is selectively operable to effect a skip or a print of the information present at any of the input terminal pairs. The individual switches comprising switching means 382 are shown in FIG. 2 as S1 through S24. A switch 383 is also shown which is selectively operable to determine any one of three modes of operation of the examplary embodiment of the present invention. Switching means 382 is used in conjunction with the mode switching means 383 so that when the mode switch 383 is in the SOP (Select-O-Print) position, only the channels selected by switching means 382 will be sensed for subsequent printing. When the mode switch 383 is in either the HLD (hold) position or the MPT (multi point) position, Switching Means 382 is not functional and the servo will balance (hold) on one channel, print a dot for every channel (multi point). In addition, a selector switch 384 is shown which is operable to prescribe the frequency of the printing of the characters which identify the input channels. For example if the selector switch 384 is in the "25" position, then one identifying character will be printed for every 25 dots. The printing carriage 30 is shown in phantom and will be presented in detail in subsequent drawings. A chart driving means 32 is shown in FIG. 22. A movable contact 4, one set of input terminal points 2, and a selector switch shaft 379 are also indicated.

Figure 23:
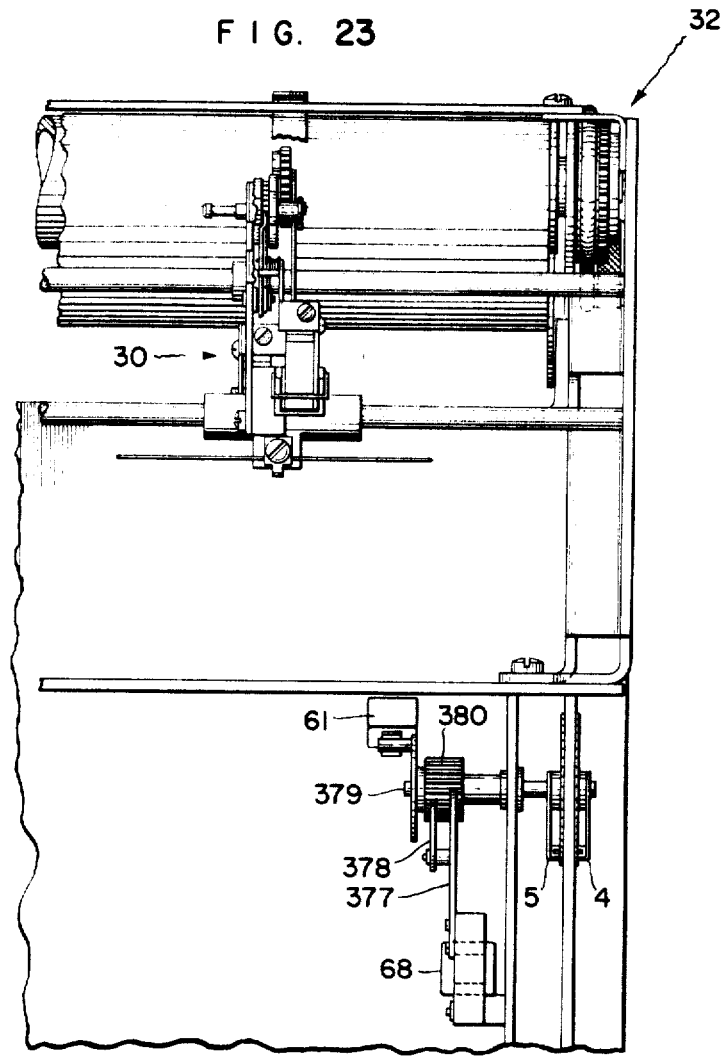
FIG. 23 is a fragmentary top view of the recording instrument according to the present invention.

FIG. 23 shows a fragmentary top view of the recording instrument according to the present invention. In common with FIG. 22, FIG. 23 indicates the printing carriage 30, chart driving means 32, shaft 379, and one movable contact 4. Additionally, a selector switch solenoid 68, a follower pawl 377, a switching means 61 and a movable contact 5 are shown. The movable contact 4 rotates about its axis 379 and sequentially scans one set of terminal points 2. Concurrently, a corresponding set of terminal points 3 located on the opposite side of the terminal board 1, are scanned by the movable contact 5 which also rotates about axis 379. Collectively the two sets of terminal points 4 and 5, comprise 24 channel input means according to the present invention. The movable contacts 4 and 5 operate jointly to sense the signal present in any one of the input channels at any one time. The signal sensed by the movable contacts 4 and 5 is fed to a measuring means and a servo means as shown in FIG. 1. The selector switch solenoid 68 activates a follower pawl 377 which prevents a selector switch ratchet wheel 380 from rotating more than 1/24 of a revolution per solenoid activating pulse.

Figure 24:
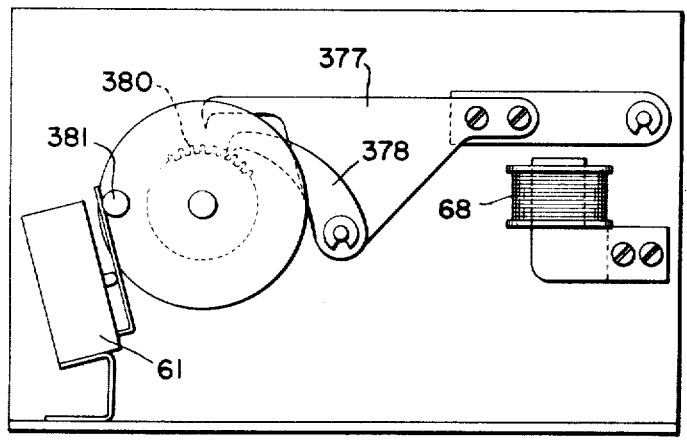
FIG. 24 is a pictorial representation of the actuating means for advancing the input scanning mechanism of the recording instrument according to the present invention.

FIG. 24 shows a more detailed side view of the solenoid 68, the follower pawl 377, the switching means 61 and the selector switch ratchet wheel 380 and shaft 379. A selector switch advance pawl 378 is also illustrated. The advance pawl 378 is spring loaded so that it is constantly in engagement with ratchet wheel 380. When the solenoid 68 is actuated, selector switch advance pawl 378 causes the ratchet wheel 380 to rotate clockwise. The follower pawl 377 moves in conjunction with the selector switch advance pawl 378 and prevents the ratchet wheel from rotating more than 1/24 of a revolution per solenoid activating pulse. An extension 381 causes the switching means 61 to change states and return to its normal position thereby causing the Programmer input terminal $\overline{SYN}$ to go to 0 and return to logic 1 once per revolution of the selector switch.

Figure 25:
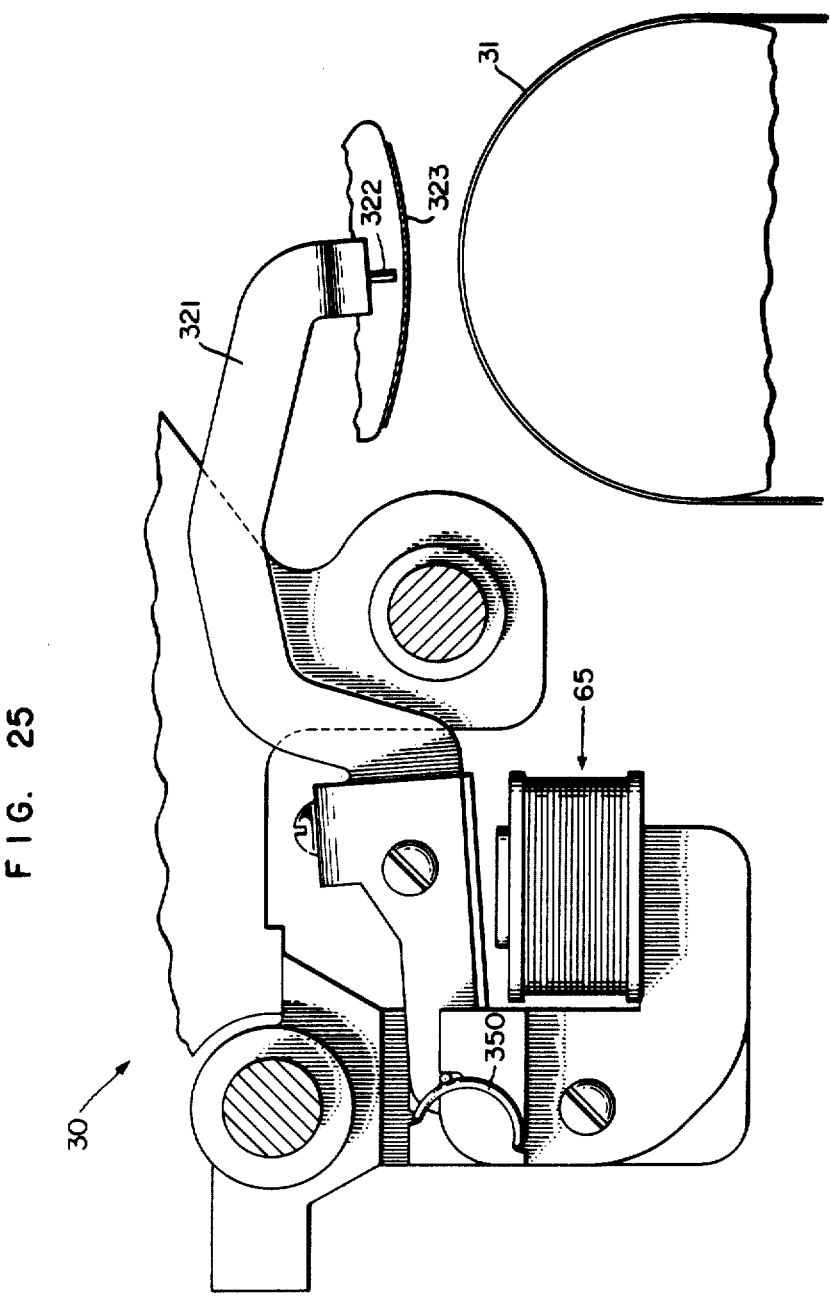
FIG. 25 is a side view of the mechanism of one printing means, such as a trace maker constructed for the recording instrument according to the present invention.
Figure 26:
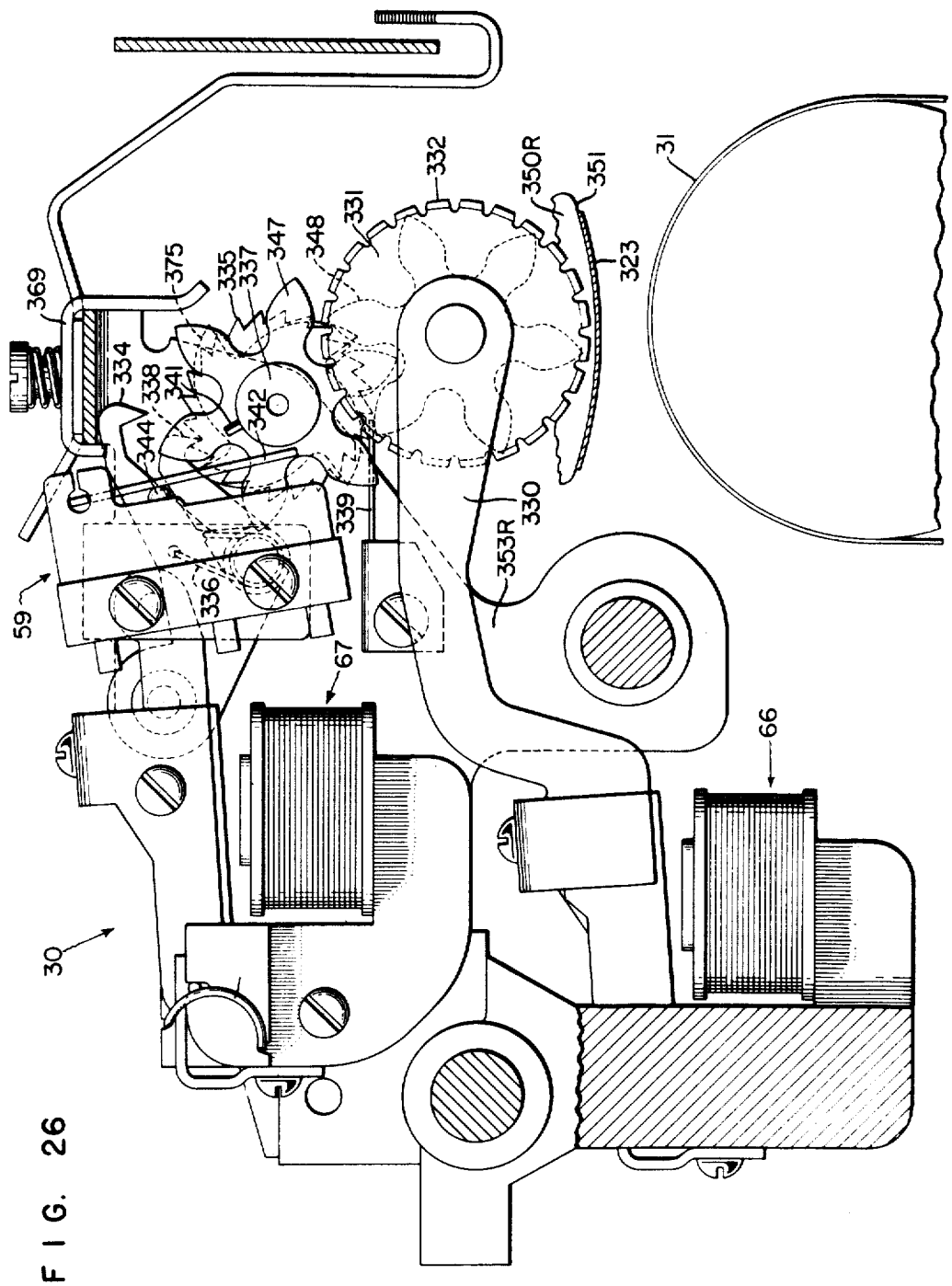
FIG. 26 is a side view of the mechanism of a second printing means, such as a trace identifying maker constructed for the recording instrument according to the present invention.

The printing carriage 30 shown in phantom in FIG. 22 is shown on an enlarged scale in FIG. 25 and FIG. 26. In FIG. 25 the solenoid 65 is mounted on a section of the printing carriage 30. An arm 321 with a print element 322 on its tip, is attached to the solenoid 65. Shown positioned between the print element 322 and the record member 321 is a section of a printing ribbon 323. The spring 350 biases the arm 321 so that the print element 322 is normally held out of contact with the printing ribbon 323. Energization of the solenoid 65 actuates the arm 321 which causes the print element 322 by means of the printing ribbon 323 to print a trace mark, such as a dot, on the record member 31.

In FIG. 26, the solenoid 66 is shown mounted on the printing carriage 30. Attached to the solenoid 66 is an arm 330 with a print element 331 on its tip. The print element 331 is an indexible print wheel having trace identifying characters or channel indicia 332 thereon. In the examplary recorder, the print element 331 has 24 track identifying characters such as numerals. Shown in position between the print element 331 and the record member 31 is a section of the printing ribbon 323. A spring 333 biases the arm 330 so that the print wheel 331 is normally held out of contact with the printing ribbon 323. Energization of the solenoid 66 actuates the arm 330 which causes the print wheel 331 by means of the printing ribbon 323 to print a selected trace identifying mark on the record member 31. The trace identifying mark selected and printed is determined by indexing the print wheel 331, as is explained hereinafter.

FIG. 26 also shows the solenoid 67 mounted on the printing carriage 30. A follower pawl 334 is pivotably attached to the solenoid 67 the pawl 334 is held normally out of engagement with a ratchet wheel 335 by a spring 336. The ratchet wheel 335 is mounted on a shaft 337. A pawl 338 is pivotably mounted on the follower pawl 334. The spring 336 holds the paws 338 in engagement with the wheel 335. Energization on the solenoid 67 actuates the pawls 334 and 338, and the pawl 338 in turn, steps the ratchet wheel 335 in a counterclockwise direction, as illustrated in the drawing. In the examplary recorder, ratchet wheel 335 has 24 teeth and is advanced 1/24 of a revolution upon each actuation of the pawl 338. The spring loaded follower pawl 334, upon actuation, rocks into contact with the ratchet wheel 335 to prevent the wheel 335 from rotating due to angular momentum beyond the desired 1/24 of a revolution. A detent 339, fixed to the frame of the carriage 30, prevents the ratchet wheel 335 from rotating in a clockwise direction. Upon de-energization of the solenoid 67, spring 340 returns the solenoid 67 to its de-energized position, the pawl 338 being stepped to engage the next higher gear of the wheel 335.

Shown in FIG. 26, projecting from the shaft 337 is a pin 341. As the ratchet wheel 335 is stepped in the counterclockwise direction as illustrated in the drawing once during each rotation of the shaft 337, the pin 341 is brought in contact and depresses an arm 342. The arm 342 is part of the pressure sensitive switch 59 and rests in contact with a switch actuator 344. Additionally, secured to the shaft 337 is a gear 347. The gear 347 engages and drives a matched gear 348. The gear 348 is fixed on the print wheel 331; thereby the print wheel 331 is advanced, i.e.; indexed, one step or trace identifying character each time the solenoid 67 is actuated.

Figure 27:
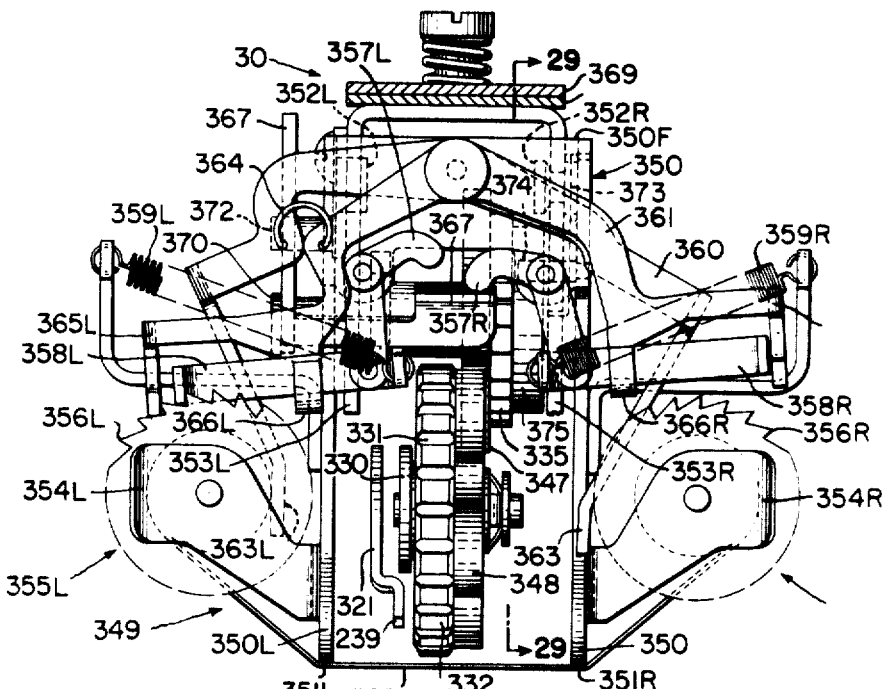
FIG. 27 is a pictorial representation of the printing means including a ribbon carriage and ribbon advancing mechanism.

The printing ribbon 323, cross-sections of which are included in FIGS. 25 and 26, is carried by a ribbon carriage 349. The carriage 349 is shown in FIG. 27 and includes a frame 350. The frame 350 is made of a single piece of light metal and has a front portion 350F extending between the upper ends of side portions 350L and 350R. The side portions 350L and 350R serve as guide members at points 351L and 351R to guide the printing ribbon 323 between the print elements 322 and 331 and the record member 31. The suffixes L and R, as hereafter used, designate respectively, the left and right sides of the ribbon carriage 349 as illustrated by FIG. 27. Viewed from above, the frame 350 appears substantially U-shaped in the vertical plane. A boss 352L is mounted on the inside face of the side portion 350L. Similarly, a boss 352R is mounted on the inside face of the side portion 350R. These bosses extend inwardly toward each other and are coaxial. Sides 353L and 353R of the printing carriage are adapted to receive the bosses 352L and 352R, respectively, for pivotably mounting the carriage 349 on the carriage 30. The manner in which the printing carriage is so adapted for pivotably mounting the ribbon carriage will be explained in greater detail in connection with FIGS. 28 and 29. A U-shaped extention 345L is secured on the outside face of the side portion 350L. An extension 354L is made of spring metal and is adapted to receive a ribbon spool 355L between the arms thereof. A similar extention 354R which is adapted to receive a ribbon spool 355R, is secured on the outside face of the side portion 350R. One end of each of the spools 355L and 355R are provided with ratchet teeth 356L and 356R, respectively. Printing ribbon 323 is wound cooperatively upon the spools 355, and the spools 355 are mounted in their associated extentions 354 so that the ribbon 323 runs between the spools 355L and 355R across the bottoms of the side portions 350.

Pivotably mounted on the left side of the frame portion 350F is a bell crank 357L. The crank 357L is cooperatively associated with a pawl 358L. The pawl 358L functions to selectively engage the ratchet teeth 356L to drive the spool 355L. In the same manner, a bell crank 357R is cooperatively associated with a pawl 358R to selectively drive the spool 355R. The pawl 358L is biased by a spring 359L while the pawl 358R is biased by a spring 359R. A pair of rocker arms 360 and 361 comprising toggle means are mounted to pivot about a pivot point 362. The point 362 is located on the vertical center line of the front frame portion 350F. Downwardly extending from each side of the rocker arm 360 are feeler arms 363L and 363R, respectively. The feeler arms 363 serve, depending on the position of the arm 360, to selectively sense the thickness of the ribbon 323 wound on one or the other of the spools 355.

The rocker arms 360 and 361 are connected by a spring 364. The spring 364 biases the arms 360 and 361 so that they are over-centered with respect to each other to opposite sides of the pivot side 362. The rocker arm 361 has a pair of depending fingers 365L and 365R adjacent to the pawls 358L and 358R, respectively. Each of the depending fingers 365 has a projection 366 which underlies the associated pawls 358. These projections 366 serve, depending upon the position of the arms 361, to selectively lift one or the other of the pawls 358, thereby preventing the lifted pawl 358 from engaging with its associated ratchet 356.

In FIG. 27 the rocker arms 360 and 361 are shown over-centered to opposite sides of the carriage 349, as biased by the spring 364. A depending finger 365L is titled downwardly and engages ratchet teeth 356L thereby serving as a detent to prevent counterclockwise rotation of the spool 355L as shown. At the same instant, the feeler arm 363L is titled upwardly to sense the thickness of the ribbon 323 wound onto the spool 355L. Activation of the pawls 358 under these conditions results in the pawl 358L engaging the ratches teeth 356L while the pawl 358R is prevented from engaging the ratchet teeth 356R by the lifting action of the projection 366R. The mechanism for simultaneously actuating the pawls 358 is described hereinafter. The printing ribbon 323 is, consequently, wound into the ribbon spool 355L from the spool 355R. As the thickness of the ribbon 323 wound on the spool 355R increases, the feeler 363L is forced more and more toward the center of the carriage 349. This displacement of the feeler arm 363L continues until the rocker arm 360 becomes overcentered to the left at which the instant the feeler arm 363L will be shifted down out of contact with ribbon 323 and the feeler arm 363R is shifted up to sense the thickness of the ribbon 323 wound onto the spool 355R. The reversal of tilt of the rocker arm 360 causes the rocker arm 361 to also reverse tilt due to the action of the spring 364. The finger 365R of the arm 361 then engages the ratchet teeth 356R action as a detent to prevent clockwise rotation of the spool 355R. Actuation of the pawls 358 then results in the pawl 358R engaging ratchet teeth 356R and the pawl 358L being prevented by the projections 366L from engaging the ratchet teeth 356L. The printing ribbon 323 is therefore wound onto the spool 355R from the spool 355L. A form of continuous printing ribbon 323 is thereby provided for the examplary recorder wherein the ribbon 323 is periodically wound from one ribbon spool 355 to the other and vice versa, with the direction that the ribbon 323 is wound, being reversed each time with the tilt of the rocker arm 360 is shifted.

In the examplary recorder, the printing ribbon 323 has six distinct longitudinal color bands impregnated with six different colored inks. By use of these color bands, the trace and channel identifying marks representing the 24 input channels are sequentially color coded. To accomplish the color coding, the printing carriage 30 and the ribbon carriage 349 are so adapted that the ribbon carriage 50 may be sequentially titled about an axis through the bosses 352 to shift the ribbon 323 to present a new color band to the printing elements 322 and 331. The carriages 30 and 349 are further adapted so that the tilt of the frame 350 also causes the bell cranks 357 to be actuated by a bell crank 367 to longitudinally advance the printing ribbon 323 in cycles of six incrimental steps which corresponds with the six increments of tilt movement. The increments of tilt movement of the frame 350 are synchronized with the scanning of the input channels so that a different color band is presented to the printing elements 331 and 322 for each input channel. Since there are six color bands, the ribbon carriage frame 350 is restored to its initial position of minimum tilt after each six increments of tilt movement.

Figures 28, 29:
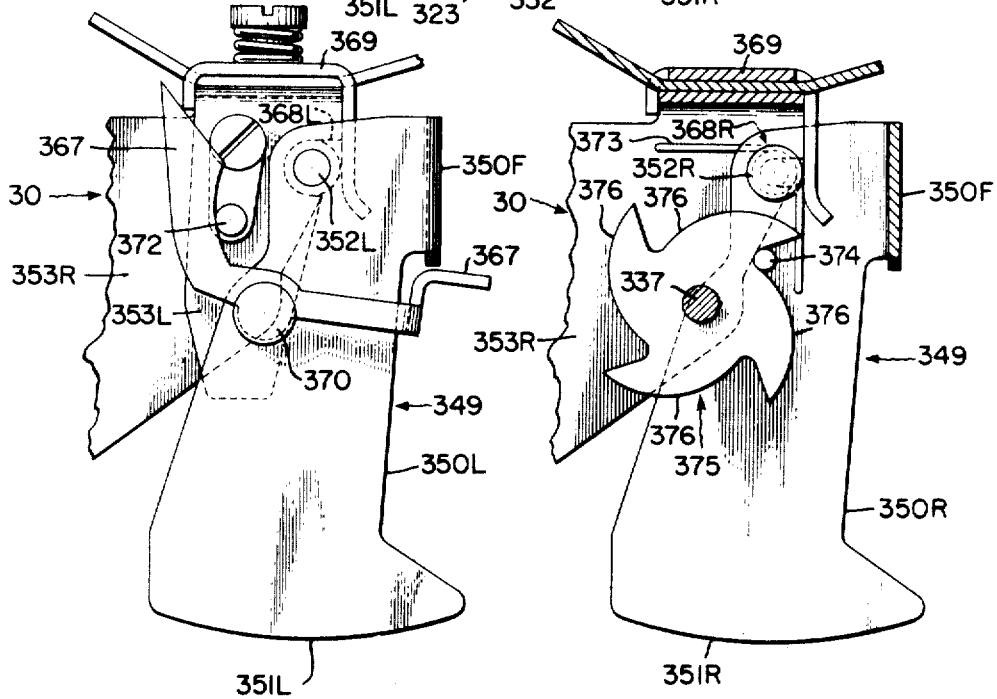
FIG. 28 is a side view of the mechanism shown in FIG. 26.
FIG. 29 is a cross sectional view of a portion of the mechanism of FIG. 27 taken along the line 12—12 thereof.

The relationship between the printing carriage and the ribbon carriage 349 is illustrated by FIG. 28 and 29. FIG. 28 shows the boss 352L inserted in a notch 368L in the printing carriage side 353L. The boss is held in place by a spring bracket 369 which is mounted on the printing carriage 30.

Pivotably mounted on the frame side 350L at a pivot point 370 is a bell crank 371. A ribbon advance pin 372 fixed on the side 353L engages the crank 367. FIG. 27 shows the boss 352R inserted in a notch 368R on the printing carriage side 353R. The boss 352R is also held in place by the spring bracket 369. Torsion spring 373 is positioned about the boss 352R. The torsion spring 373 has one of its ends anchored to the carriage 30 and its other end to the carriage 349. Mounted on the shaft 337 is a cam 375 having four identical cam faces 376. The shaft 337 and the rotation thereof was previously discussed in connection with FIG. 24. Each cam face 376 corresponds in time relationship with six sequential input channels, since in a complete rotation the shaft 337 is stepped 24 times and the steps correspond in time with the step scanning of the 24 input channels.

A pin 374 is suitably mounted on the ribbon carriage side portion 350R to ride sequentially against the cam faces 376 as the shaft 337 is rotated. In FIG. 27, the pin 374 is shown resting in the root of the cam face 376 with the ribbon carriage 349 in its initial position where the tilt of the frame 350 is at a minimum. As the shaft 337, as illustrated in FIG. 28, is stepped counterclockwise, the cam 375 tilts the frame 350 upwardly and to the right, thereby shifting the printing ribbon 323 to present a different color band to the printing elements 331 and 322. The cam 375 continues to tilt the frame 350 upwardly until the 6th step of rotation of the shaft 337. At that time, the pin 374 falls off the peak of its then associated cam face 376 into the root of the next sequential cam face 376, thereby returning the ribbon carriage 349 to its initial position. The spring action of the torsion spring 373 returns the carriage 349 to its initial position and holds the pin 374 against its associated cam face 376. With further stepped rotation of the shaft 337, the color bands are recycled. In addition, each increment of tilt movement of the frame 350 causes the ribbon advance pin 372 to actuate the bell crank 367 in corresponding increments. This stepped actuation of the crank 367, in turn results in stepped actuation of the pawls 358 and corresponding incremental longitudinal advancement of the printing ribbon 323. In the examplary recorder, the spool 355, being driven, is rotated through the angular distance occupied by one ratchet tooth 356 for each complete tilt cycle of the ribbon carriage frame. Further, the action of the pin 374 falling from the peak of one cam face 376 to the root of the next, returns the bell crank 367 to its initial position, the pawls 374 thereby assuming their initial position with the instant driving pawl 358 prepared to engage the next associated ratchet tooth 356.

In operation, input signals may be applied to each of the 24 input channels of the examplary recorder. The mode of recorder operation is selected by manually switching the switching means 383. Switching means 383 controls ganged contacts 383A and 383B and has three switching positions MPT, SOP, and HOLD, which represent respectively the multi-point, Select-O-Print and HOLD modes of recorder operation. The "off-on" switch 57 of the recorder allows power to be applied to the servo motor through one contact 57B, and permits a logic 0 voltage to be fed to the digital programmer through another contact 57A. Whenever the switch 57 is switched to the "on" position, a logic 0 pulse appears on the $\overline{INI}$ terminal of the digital programmer 40. This signal is further conditioned in the sequensor and participates in the generation of a CLR signal. The $\overline{INI}$ signal is also inverted in the sequensor and is fed to the skip numeral circuit as the INI input. The INI signal causes the memory elements in the skip numeral circuit to be reset. The CLR signal generated by the INI signal acts to reset the memory elements of the signal generator and also the memory elements of the encoder. Therefore, whenever the recording instrument is turned "on," a "time 0" reference is established and the counters included in the digital programmer 40 begin to count from this reference "time 0." The introduction of the INI signal through the "off-on" switch 57 also precludes the printing operation until the input channel selector switch and the numeral wheel are both synchronized on the first input channel. Provisions are also included to synchronize "slave" recorders with the receipt of the "master" INI signal. An obvious advantage of this arrangement is that the recorder will automatically synchronize itself after a power failure, and begin again to print at the first input channel. A periodic self-checking feature is also incorporate in the exemplary embodiment of the present invention. A logic 0 is introduced on the $\overline{SYN}$ input terminal of the digital programmer for every 24 advances of the input channel selector switch by means of the extension 381 momentarily contacting the microswitch 61 (FIG. 24). As shown in FIG. 1, this momentary contact opens the normally closed switch 61. A numerical wheel feedback signal $\overline{NWFB}$ is generated in a similar manner by the actuation of the pressure sensitive switch 59 located on the printing carriage. The digital programmer 40 also has a provision to accept another external feedback synchronization signal. This is indicated by the digital programmer input terminal $\overline{EXFB}$. This external synchronization signal will be generated in much the same manner as the other synchronization signals and the normally closed switch 63 shown in FIG. 1 would be located on a slave recorder remotely located from the master recorder. When the selector switch advance synchronization signal $\overline{SYN}$ is generated the sequensor tests for the presence of all the synchronization signals. If all of the synchronization signals are not present at that time, advance pulses will be generated until the synchronization signals appear. For example when a $\overline{SYN}$ signal is generated and there is no numeral wheel feedback signal ($\overline{NWFB}$ is at logic 1), numeral wheel advance pulses will be generated until the sequenser senses the receipt of a numeral wheel feedback synchronization signal ($\overline{NWFB}$ goes to logic 0). The same synchronizing operation may occur if no external feedback synchronization signal is sensed ($\overline{EXFB}$ is at logic 1) at the time $\overline{SYN}$ goes to a logic 0. In case the numeral wheel is several channels out of synchronization with the input channel selector switch, the advance pulses are generated at a faster rate than that rate normally experienced during a printing cycle. This action minimizes lost recording time. The $\overline{SYN}$ signal acts to reset the memory elements of the SOP interrogating circuit of the chip B. This is required for the proper recorder functioning when the recorder is in the Select-O-Print (SOP) mode of operation.

With the power on, and switching means 383 set to MPT (Multipoint) the examplary recorder acts as a multiple point, sequentially scanning, sensing, and recording the input signals present on all of the several input channels. The power to the servo motor 17 is conditionally applied from an A.C. source 20 to the motor reference winding 18 through a switch contact 57B and a capacitor 19. The recorder servo driving motor 33 receives its power through a switch 36 connecting an AC source 35 to the motor winding 34. It is here noted that the application of the power from the source 20 upon the servo motor winding 18 depends upon the conducting state of the triac 23.

When a voltage representative of a logic 0 appears on the control electrode 24 of the triac 23, the triac will conduct and effectively short-circuit the servo motor winding 18, thereby stopping the servo motor. If the voltage appearing at the control electrode 24 is not that representative of a logic 0, the triac will not conduct and conditionally, power will be supplied to the servo motor winding thereby enabling operation of the servo motor. A more complete description of the operation of the triac to control the application of the power source 20 to the servo motor winding 18 is explained and claimed in the copending application, Ser. No. 815,097 by Frederick S. Hutch, filed on Apr. 10, 1969.

The contacts 4 and 5 correct the sensed input signal to a servo system comprising the slidewire resistors 6 and 8, the slidewire contactor 7, the measuring circuit 9, the amplifier 15 and the servo motor 17. With the control winding 16 connected across the differential amplifier 15, the servo system operates in a manner similar to other servo positioning systems well known in the art.

The output of the amplifier 15 drives the servo motor 17 which, in turn, positions the printing carriage 30 laterally over the record member 31. Mounted to be moved coincidently with the carriage 30 is the slidewire contactor 7 which is thereby positioned along the slidewire resistors 6 and 8. The servo motor 17 continues to position the carriage 30 and the slidewire contactor 7 until the input signal driving the amplifier 15 reaches a null. A null will occur when the signal picked off by the contactor 7 from the resistor 6 and fed through the measuring circuit 9 equals the input signal to the amplifier 15 taken from the associated recorder input terminal 3. The electrical signal impressed on the resistor 6 is the input signal present on the associated recorder input terminal 2. Thereby the contactor 7 and the carriage 30 are positioned to represent proportionally the magnitude of the particular input signals being sensed on the associated recorder terminals 2 and 3. The servo system will continue to be responsive to variations in these particular input signals until a logic 0 is received by triac 23 on the $\overline{SRD}$ input terminal 24. At that time triac 23 conducts and thereby shorts out the servo motor winding 18 which, in turn, disables the servo motor 17. While the servo motor 17 is so disabled, the carriage 21 is prevented from moving and the printing cycle may continue.

Next a Dot Print Pulse (DPR) and, conditionally, a Numeral Print Pulse (NPR) are generated. The DPR flows to the control electrode 75 of the Silicon Controlled Rectifier (SCR) 70 to allow the SCR to conduct and thereby activate solenoid 65. Depending upon the condition of switching means 384 (FIG. 22), the NPR solenoid 66 may also be energized. The solenoids 65 and 66 respond to these electrical pulses whereby to actuate the arms 321 and 330, respectively, (FIG. 25 and FIG. 26). As before explained in connection with FIG. 25, actuation of the arm 321 results in the printing of a trace mark, such as a dot, through use of the print element 322, and the printing ribbon 323. Similarly, as explained in connection with FIG. 26, actuation of the arm 330, results in the printing of a trace identifying mark, such as a numeral, through use of the print wheel 331 and the printing ribbon 323.

The print wheel 331 is indexed once during each channel recording cycle so that the trace identifying marks selectively printed, correspond with respective input channels being sensed. In conjunction with the indexing of the print wheel 331, the printing ribbon 323 is shifted so that each trace mark, printed is color coded. The indexing is done by means of a Numeral Wheel Advance (NWA) pulse which is generated by the programmer. The solenoid 67 responds to the pulse whereby to actuate the pawl 338 which, as described in connection with FIG. 25, engages and turns the ratchet wheel 335, thereby the shaft 337 is turned one 24th of a revolution. The rotation of the shaft 337 rotates the pin 341 and indexes the wheel 331, by means of the matching gears 347 and 348, to correspond to the next input channel to be sensed. As explained in connection with FIGS. 26-28, the one 24th of a revolution of the shaft 337, also tilts the ribbon carriage 349 to shift the printing ribbon 323 to present a new and next adjacent color band to the printing elements 322 and 331. The new color band corresponds with the next input channel to be sensed, and the tilting motion of the carriage 349 incrementally advances the printing ribbon 245 laterally.

A Selector Switch Advance (SSA) pulse is then generated by the programmer 40. The SSA pulse allows the SCR 73 to conduct and thereby energizes the SSA solenoid 68. As explained in connection with FIG. 24, after being actuated, the solenoid 68 causes the conjunctive movement of pawls 377 and 378 which in turn cause the selector switch shaft 379 to advance one 24th of a revolution, i.e. one scan interval; thereby the movable contacts 4 and 5 which are fixed to the shaft 379 are rotated one scan interval to the position corresponding with the next input channel.

When switch 57 is closed and switching means 383 is set to the SOP position, the examplary recorder operates as a multiple point recorder with the added capability of being able to skip preselected ones of the input channels. This preselection process is accomplished through the switching means 382 shown in FIG. 2 and FIG. 22. As hereinbefore described in connection with FIG. 18, whenever an input channel is preselected to be skipped, a logic 1 will appear on the SOP input terminal of the Sequenser. Through the action of the sequenser, whenever a logic 1 is present at the SOP input terminal, a selector switch advance pulse SSA is generated before the servo system has been allowed to balance in a position representative of the value of the signal present on the input channel being sensed. Therefore when several input channels are preselected to be skipped in succession, the input channel selector switch will advance at an accellerated rate and not allow the servo system to balance at any one of the points selected to be skipped. When the selector switch arrives at the next point to be printed, a logic 0 will appear at the SOP input terminal of the Sequensor, thereby allowing the normal recording operation to occur.

When switching means 383 (FIG. 2) is set to the HLD (Hold) position, a logic 1 appears at the HLS input terminal of chip A. Through the action of the Encoder, (FIG. 9) the HLD signal causes the "ON" signal to go to 0 thereby disabling the Timing Signal Generator of the digital programmer 40. With the Timing Signal Generator disabled, no timing signals will be produced and hence the normal recorder operation will be arrested. Without the generation of the timing signals, the servo disable signal SRD will not appear and therefore the servo system will not be disabled. In this situation, the servo system will "follow" the signal presented at the input channel. The input channel selector switch will remain on one particular input channel until the switching means 383 is switched to either the SOP (Select-O-Print) or MPT position. At that time the recorder will advance to the next input channel and continue its normal operation. It is here noted that the switching operation from the HOLD mode to the MPT or SOP modes may be momentary in which case the recorder will print on demand (when switched) and then advance to the next input channel and HOLD. The momentary switching operation may also be accomplished by means of an externally generated control pulse to initiate this "demand printing" feature. With the "demand printing" feature, the monitored recorder operation may be automatically correlated to external events.

Thus there has been provided an improved multiple point recorder including a printing means for printing trace record and trace identifying marks, and color-coded means for coding the colors of the record traces representing the various input channels, and characterized by a digitally controlled programmer responsive to a plurality of variable input signals and capable of generating sequentially recurring output signals to effect several distinct modes of recorder operation.

The embodiments of the invention in which an exclusive property or privilege is claimed are defined as follows:

1. In a multiple point recorder wherein a plurality of input channels are sequentially sensed and the values of the signals sensed at the several channels are sequentially recorded on a record member, the improvement comprised, in combination with said recorder of solid state electronic digital programming means operable to program the sequential sensing of said input channels and the recordation of the values of said sensed signals on said record member.

2. The invention as set forth in claim 1 wherein said digital programming means includes:
means for generating a series of control signals having predetermined time intervals, said signals corresponding in time sequence with the sequential scanning of said input signals; and
wherein said recorder includes:
selection means selectively operable to select predetermined ones of said control signals;
print means operable to effect said recordation; and
actuating means responsive to said selected control signals to operate said print means in timed intervals corresponding with said selected control signals.

3. The invention as set forth in claim 2 wherein said digital programming means further includes:

means for generating a series of pulses, each pulse being operative to cause the recordation of an identifying indicium corresponding to the related input channel;
and wherein said recorder further includes:
second print means operable to effect said recordation of said identifying indicium; and
second actuating means responsive to said pulses to operate said second print means.

4. The invention as set forth in Claim 1 wherein said digital programming means includes:
a reference signal generating means for generating a series of reference signals;
second signal generating means responsive to said reference signals and operable conditionally to produce base timing signals to a fixed time relationship with respect to said reference signals;
third signal generating means responsive to signals from said second signal generating means and conditionally operable to produce a plurality of recorder timing signals, each of said recorder timing signals having a different predetermined time relationship with respect to said base timing signals;
first pulse generating means responsive to selected ones of said recorder timing signals to conditionally generate a plurality of control pulses with predetermined time relationships with respect to said recorder timing signals;
second pulse generating means responsive to selected ones of said control pulses, selected ones of said base timing signals and selected ones of said recorder timing signals, to conditionally generate recorder coordinating and recorder actuating pulses in a predetermined sequence.

5. The invention as set forth in claim 4 wherein said digital programming means further includes:
third pulse generating means responsive to said coordinating pulses and selected ones of said base timing signals conditionally to generate a series of identifying indicium actuating pulses at a predetermined rate with respect to said sequential sensing of said input channels;
and wherein said recorder includes:
first actuating means responsive to a predetermined one of said recorder actuation pulses;
first print means responsive to said actuating means and operable to effect said recordation of said values of the signals sensed at said input channels;
second actuating means responsive to said identifying indicium actuating pulse;
second print means responsive to said second actuating means and operable to effect the recordation of an identifying indicium corresponding to the related input channel, wherein said second print means comprises a print wheel having a plurality of marking indicia substantially equally spaced around the periphery of said print wheel.

6. The invention as set forth in claim 5 wherein said recorder includes:
first selection means operable to select identifying indicium actuating pulses from said series at one of a plurality of rates less than said predetermined rates;
and wherein said third pulse generating means includes:
first decoding means responsive to said selection means and operable in conjunction with said second signal generating means and said second pulse generating means conditionally to generate identifying indicium actuating pulses at said one of a plurality of rates less than said predetermined rate.

7. The invention as set forth in claim 6 wherein said recorder is further characterized by:
first selection means operable to select identifying indicium actuating pulses from said series at a rate which is a submultiple of said predetermined rate;
and wherein said third pulse generating means is further characterized by:
decoding means responsive to said selection means and operable in conjunction with said second signal generating means and said second pulse generating means conditionally to generate identifying indicium actuating pulses at said rate which is a submultiple of said predetermined rate.

8. The invention as set forth in claim 7 wherein said recorder means further includes:
second selection means operable to select one of a plurality of individual input channel recorder cycle times;
and wherein said digital control means further includes:
second decoding means responsive to said second selection means and operable in conjunction with said third signal generating means conditionally to generate pulses of a time interval representative of said selected individual channel recorder cycle times.

9. The invention as set forth in claim 8 wherein said recorder further includes:
servo means;
position detecting means responsive to said servo means and operable to generate a signal representative of the position of said servo means with respect to said record member;
alarm detecting means responsive to signals from said position detecting means conditionally to generate an alarm condition signal;
and wherein said digital control means further includes:
fourth pulse generating means responsive to selected ones of said third signal generating means and selected ones of said first and second pulse generating means and operable conditionally to generate alarm detecting pulses wherein said pulses conditionally actuate said alarm detecting means repetitively at a preselected time interval after the beginning of said individual input channel print cycles.

10. The invention as set forth in claim 9 wherein said recorder further includes:
third selection means operable to select one of a plurality of said preselected time intervals:
and wherein said digital control means further includes:
gating means responsive to said third selection means and operable to vary the time duration of said preselected time intervals.

11. The invention as set forth in claim 10 wherein said recorder further includes:
first indexing means;
third actuating means coupled to said first indexing means, and operable to effect rotation of said first indexing means;
second indexing means responsive to first indexing means and coupled to said second print means and operable to effect rotation of said second print means one identifying indicium per activation of said third actuating means; and
wherein said second pulse generating means includes:
fifth pulse generating means responsive to said coordinating pulses and operable to produce third actuating means energization pulses.

12. The invention as set forth in claim 11 wherein said recorder includes:
sixth pulse generating means coupled to said second indexing means and operable to periodically generate one cycle coordinating pulse for every 360° rotation of said second print means;
scanning means responsive to one of said actuating pulses and operable to sequentially sense said input channel;
seventh pulse generating means coupled to said scanning means and conditionally operable to periodically generate one cycle coordinating pulse for every 360° rotation of said scanning means;
and wherein said digital control means includes:
first pulse coordinating means responsive to said cycle coordinating pulses and operable to synchronizing said second print means with said scanning means.

13. The invention as set forth in claim 12 wherein said digital programming means further including:
second pulse coordinating means responsive to said first pulse coordinating means and a plurality of coordinating pulses external to said recorder, and operable to synchronize all of said coordinating pulses.

14. The invention as set forth in Claim 13 wherein said recorder includes:
selection means operable to predetermine one of a plurality of modes of operation of said recorder;
display means responsive to said values of said signals present at said input channels and operable to visually indicate the magnitude of said values;
and wherein said digital control means further includes:
eight pulse generating means responsive to said fourth selection means and conditionally operable to arrest the sequential scanning of said input channels, and to allow said display means to follow the variation in magnitude of any one of said input channels.

15. The invention as set forth in claim 14 wherein said recorder includes:
fifth selection means;
and wherein said digital control means includes:
ninth pulse generating means responsive to said fifth selection means and operable to produce a pulse whereby to establish a reference starting point in time for subsequent signal generation sequensing.

16. A multiple point recorder wherein a plurality of input channels are sequentially sensed and the values of the input signals sensed at the several channels are sequentially recorded on a record member, said recorder comprising:
a servo amplifier;
a scanning means connecting said input channels sequentially to said servo amplifier;
print means operable to effect a recordation of the signals from said input channels;
servo means responsive to output signals from said servo amplifier to position said print means relative to said record member;
solid state electronic digital control means operable to produce a series of control pulses for programming the operation of said recorder;
first actuating means coupled to said scanning means and responsive to said control signals to selectively actuate said scanning means whereby to preform the sequential scanning of said input channels; and
second actuating means coupled to said print means and responsive to selected ones of said control signals from said digital control means to actuate said print means whereby to effect a recordation on said record member in time-phase relationship to the sequential sensing of said input channels by said scanning means.

17. The invention as set forth in claim 1 wherein said solid state electronic digital programming means includes an electronic multivibrator clock means as a basic timing element.

18. The invention as set forth in claim 16 wherein said solid state electronic digital control means includes an electronic multivibrator clock means as a basic timing element.

* * * * *